(12) United States Patent
Schoenberg

(10) Patent No.: US 9,443,411 B2
(45) Date of Patent: Sep. 13, 2016

(54) SYSTEMS AND METHODS FOR NETWORKING OF CAR SEAT MONITORING SYSTEMS UTILIZING A CENTRAL HUB

(71) Applicant: Cars-N-Kids LLC, St. Louis, MO (US)

(72) Inventor: Gregory B. Schoenberg, St. Louis, MO (US)

(73) Assignee: Cars-N-Kids LLC, St. Louis, MO (US)

( * ) Notice: Subject to any disclaimer, the term of this patent is extended or adjusted under 35 U.S.C. 154(b) by 0 days.

(21) Appl. No.: 14/193,670

(22) Filed: Feb. 28, 2014

(65) Prior Publication Data

US 2014/0292503 A1 Oct. 2, 2014

Related U.S. Application Data

(63) Continuation-in-part of application No. 13/648,949, filed on Oct. 10, 2012, and a continuation-in-part of application No. 13/370,021, filed on Feb. 9, 2012, now abandoned, which is a continuation-in-part of
(Continued)

(51) Int. Cl.
| | |
|---|---|
| *G08B 21/18* | (2006.01) |
| *B60R 22/48* | (2006.01) |
| *B60N 2/00* | (2006.01) |
| *B60N 2/28* | (2006.01) |

(Continued)

(52) U.S. Cl.
CPC .............. *G08B 21/18* (2013.01); *B60N 2/002* (2013.01); *B60N 2/0244* (2013.01); *B60N 2/28* (2013.01); *B60N 2/2869* (2013.01); *B60N 2/2875* (2013.01); *B60R 21/01556* (2014.10); *B60R 22/48* (2013.01); *B60N 2002/0264* (2013.01); *B60N 2002/2815* (2013.01); *B60Q 1/50* (2013.01); *B60R 2022/4841* (2013.01); *B60R 2022/4866* (2013.01)

(58) Field of Classification Search
CPC ............ B60R 21/01556; B60R 22/48; B60R 2022/4858; B60R 2022/4866; B60R 2022/4841; G08B 1/02; G08B 21/18; G08B 21/22; G08B 21/02; B60Q 1/00; B60Q 9/00; B60N 2002/2815
USPC .......... 340/457, 457.1, 573.1, 573.4, 539.11, 340/425.5, 438; 307/9.1, 10.1; 297/217.2, 297/217.3; 180/271, 273
See application file for complete search history.

(56) References Cited

U.S. PATENT DOCUMENTS

| | | |
|---|---|---|
| 5,790,031 A | 8/1998 | Shelton et al. |
| 5,793,291 A | 8/1998 | Thornton |

(Continued)

FOREIGN PATENT DOCUMENTS

WO 2009079477 A2 6/2009

OTHER PUBLICATIONS

Halo, "The Halo Baby Seat Safety System," http:/sistersofinvention.com/child_products/readch.html, printed on Jul. 18, 2012, 2 pages.
(Continued)

*Primary Examiner* — Hung T Nguyen
(74) *Attorney, Agent, or Firm* — Lewis Rice LLC

(57) ABSTRACT

Systems and methods for monitoring child seats and children in child seats through sensors paired with a central processing hub which in turn relays notifications of conditions to caregivers or other users based on a notification hierarchy and the urgency of the conditions detected.

18 Claims, 17 Drawing Sheets

Related U.S. Application Data application No. 12/335,421, filed on Dec. 15, 2008, now Pat. No. 8,212,665, application No. 14/193,670, which is a continuation-in-part of application No. 13/835,498, filed on Mar. 15, 2013, which is a continuation-in-part of application No. 13/648,949, filed on Oct. 10, 2012.

(60) Provisional application No. 61/917,173, filed on Dec. 17, 2013, provisional application No. 61/545,354, filed on Oct. 10, 2011, provisional application No. 61/678,508, filed on Aug. 1, 2012, provisional application No. 61/441,199, filed on Feb. 9, 2011, provisional application No. 61/504,113, filed on Jul. 1, 2011, provisional application No. 61/538,647, filed on Sep. 23, 2011, provisional application No. 61/013,939, filed on Dec. 14, 2007.

(51) Int. Cl.
    *B60R 21/015* (2006.01)
    *B60N 2/02* (2006.01)
    *B60Q 1/50* (2006.01)

(56) References Cited

U.S. PATENT DOCUMENTS

| | | | |
|---|---|---|---|
| 5,966,070 A | 10/1999 | Thornton | |
| 6,236,333 B1 | 5/2001 | King | |
| 6,366,200 B1 | 4/2002 | Aoki | |
| 6,448,895 B1 | 9/2002 | Ekkel | |
| 6,480,103 B1 | 11/2002 | McCarthy et al. | |
| 6,794,590 B2 | 9/2004 | Federspiel | |
| 6,798,084 B1 | 9/2004 | Gobel et al. | |
| 6,819,247 B2 | 11/2004 | Birnbach et al. | |
| 6,819,249 B1 | 11/2004 | Papp | |
| 6,847,302 B2 | 1/2005 | Flanagan et al. | |
| 6,850,824 B2 | 2/2005 | Breed | |
| 6,868,734 B2 | 3/2005 | Jakoby et al. | |
| 6,922,147 B1* | 7/2005 | Viksnins et al. | 340/573.1 |
| 6,922,622 B2 | 7/2005 | Dulin et al. | |
| 6,924,742 B2 | 8/2005 | Mesina | |
| 6,998,988 B1 | 2/2006 | Kalce | |
| 7,009,522 B2 | 3/2006 | Flanagan et al. | |
| 7,012,533 B2 | 3/2006 | Younse | |
| 7,170,401 B1 | 1/2007 | Cole | |
| 7,188,898 B2* | 3/2007 | Patterson et al. | 297/250.1 |
| 7,319,382 B1 | 1/2008 | Vu | |
| 7,325,870 B2 | 2/2008 | Lawrence et al. | |
| 7,348,880 B2 | 3/2008 | Hules et al. | |
| 7,378,974 B1* | 5/2008 | Bassett et al. | 340/573.1 |
| 7,438,880 B2 | 10/2008 | Hung et al. | |
| 7,457,695 B1 | 11/2008 | Fields et al. | |
| 7,567,181 B1 | 7/2009 | Davison | |
| 7,650,864 B2 | 1/2010 | Hassan et al. | |
| 7,701,358 B1 | 4/2010 | White et al. | |
| 7,714,737 B1 | 5/2010 | Morningstar | |
| 7,830,270 B1 | 11/2010 | Philbert | |
| 7,994,906 B2 | 8/2011 | Salazar | |
| 8,058,983 B1 | 11/2011 | Davisson et al. | |
| 8,063,788 B1 | 11/2011 | Morningstar | |
| 8,212,665 B2* | 7/2012 | Schoenberg | B60N 2/002 307/10.1 |
| 8,217,796 B2 | 7/2012 | Trummer | |
| 2002/0118121 A1 | 8/2002 | Lehrman et al. | |
| 2003/0098792 A1 | 5/2003 | Edwards et al. | |
| 2003/0128107 A1 | 7/2003 | Wilkerson | |
| 2003/0160689 A1 | 8/2003 | Yazdgerdi | |
| 2003/0222775 A1* | 12/2003 | Rackham et al. | 340/457 |
| 2004/0011277 A1 | 1/2004 | Barnes et al. | |
| 2004/0075581 A1 | 4/2004 | Staniszewski | |
| 2005/0024188 A1* | 2/2005 | Sider | 340/425.5 |
| 2005/0035862 A1 | 2/2005 | Wildman et al. | |
| 2005/0068162 A1 | 3/2005 | Santa Cruz et al. | |
| 2005/0137462 A1 | 6/2005 | Cho | |
| 2005/0280297 A1 | 12/2005 | Patterson et al. | |
| 2006/0044126 A1* | 3/2006 | Ho et al. | 340/457 |
| 2006/0049929 A1 | 3/2006 | Lawrence et al. | |
| 2006/0103516 A1* | 5/2006 | Zang | B60N 2/002 340/457 |
| 2006/0111821 A1 | 5/2006 | Wallner et al. | |
| 2006/0208911 A1 | 9/2006 | Davis | |
| 2007/0055428 A1 | 3/2007 | Kong et al. | |
| 2008/0052259 A1 | 2/2008 | Shiffman et al. | |
| 2008/0055064 A1 | 3/2008 | Keith et al. | |
| 2008/0088437 A1 | 4/2008 | Aninye et al. | |
| 2008/0164990 A1 | 7/2008 | Anderson | |
| 2008/0167806 A1 | 7/2008 | Wheeler et al. | |
| 2009/0079557 A1* | 3/2009 | Miner | B60N 2/002 340/457.1 |
| 2009/0234542 A1 | 9/2009 | Orlewski | |
| 2009/0292423 A1 | 11/2009 | Norton | |
| 2009/0303025 A1 | 12/2009 | Wahlstrom | |
| 2010/0253498 A1 | 10/2010 | Rork et al. | |
| 2010/0264706 A1 | 10/2010 | Vogt et al. | |
| 2012/0232749 A1* | 9/2012 | Schoenberg | B60N 2/002 701/36 |
| 2013/0021476 A1 | 1/2013 | Trummer | |
| 2013/0049955 A1 | 2/2013 | Hoover et al. | |
| 2013/0201013 A1 | 8/2013 | Schoenberg | |
| 2013/0278408 A1 | 10/2013 | Schoenberg et al. | |

OTHER PUBLICATIONS

International Search Report, International Patent Application No. PCT/US2008/086882, mailed on Jun. 29, 2009, 11 pages.
International Search Report, International Patent Application No. PCT/US12/24529, mailed on Oct. 18, 2012, 10 pages.
International Search Report, International Patent Application No. PCT/US12/59583, mailed on Mar. 20, 2013, 11 pages.
International Search Report, International Patent Application No. PCT/US13/50610, mailed on Oct. 14, 2013, 13 pages.
"PMV16UN," Product Data Sheet, NXP B.V., http://www.nxp.com/documents/data_sheet/PMV16UN.pdf, Apr. 2011, 16 pages.
"Zeners BzX84C 3V3—BZX84C 33," Fairchild Semiconductor Corporation, http://www.fairchildsemi.com/ds/BZ/BZX84C9V1.pdf, 2001, 4 pages.
International Search Report, International Patent Application No. PCT/US2014/070752, mailed on Apr. 1, 2015, 12 pages.
International Search Report, International Patent Application No. PCT/US2015/020209, mailed on Jun. 1, 2015, 10 pages.

* cited by examiner

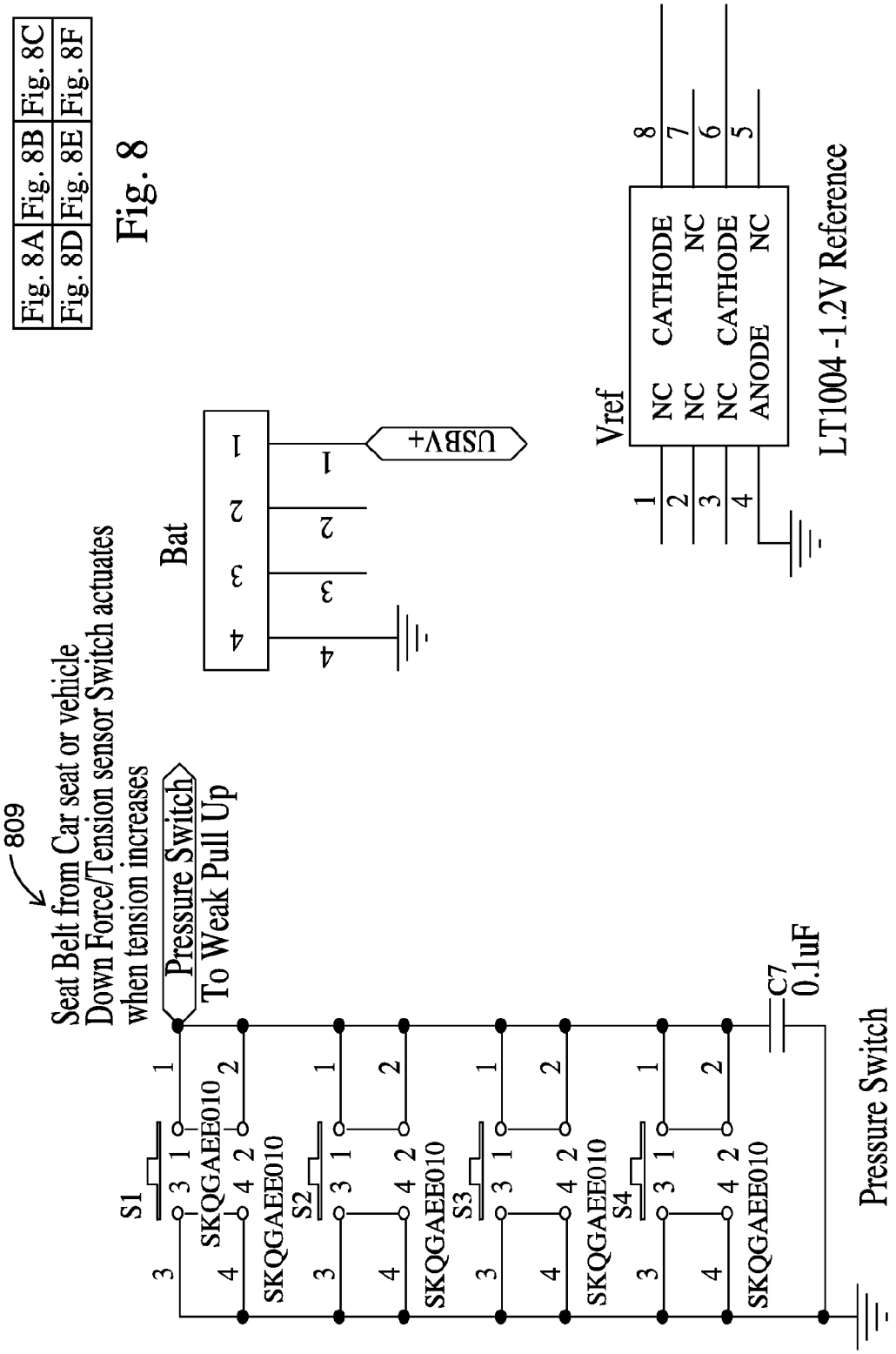

SYSTEMS AND METHODS FOR NETWORKING OF CAR SEAT MONITORING SYSTEMS UTILIZING A CENTRAL HUB

CROSS REFERENCE TO RELATED APPLICATION(S)

This application claims the benefit of U.S. Provisional Application Ser. No. 61/917,173, filed Dec. 17, 2013. This application is also a Continuation-in-Part (CIP) of U.S. Utility application Ser. No. 13/648,949, filed Oct. 10, 2012, which claims benefit of U.S. Provisional Patent Application 61/545,354, filed Oct. 10, 2011, and U.S. Provisional Patent Application 61/678,508, filed Aug. 1, 2012, and which is a Continuation-in-Part (CIP) of United States Utility patent application Ser. No. 13/370,021, filed Feb. 9, 2012, which, in turn, claims the benefit of U.S. Provisional Application Ser. No. 61/441,199, filed Feb. 9, 2011, U.S. Provisional Application Ser. No. 61/504,113, filed Jul. 1, 2011, and U.S. Provisional Application Ser. No. 61/538,647, filed Sep. 23, 2011, and which is a Continuation-in-Part (CIP) of United States Utility patent application Ser. No. 12/335,421, now U.S. Pat. No. 8,212,665, which, in turn, claims the benefit of U.S. Provisional Application Ser. No. 61/013,929, filed Dec. 14, 2007. This application is also a Continuation-in-Part (CIP) of U.S. Utility application Ser. No. 13/835,498, filed Mar. 15, 2013, which is also a Continuation-in-Part (CIP) of U.S. Utility application Ser. No. 13/648,949, filed Oct. 10, 2012, as referenced herein. The entire disclosure of all of these documents is herein incorporated by reference.

BACKGROUND

1. Field of the Invention

This disclosure is related to the field of child safety restraints. Specifically, to restraints which can detect the orientation and report various conditions relating to the status of the child and restraint in a vehicle.

2. Description of the Related Art

Caregivers of children often must travel with those children in a vehicle. Because the safety belts preinstalled in most vehicles are sized for use with an adult, those safety belts are generally unsuitable and dangerous for use with children. To remedy this, infant, toddlers, and young children use specially designed safety restraints in the form of a "car seat" or "child seat," a separate chair placed in the car on top of the vehicular seat and attached to the vehicle, generally using either specially designed connectors for that purpose, such as the LATCH system, or the vehicle's preinstalled safety belts.

However, the majority of vehicular child safety restraint seats, popularly called "child seats," are not properly installed, and an improperly installed seat exposes the child to increased risk of injury. Although child seat manufacturers and automobile companies provide detailed instructions on how to install child seats in vehicles, users routinely install the child seats at improper angles, with incorrect tension on the restraining belts between the seat and the vehicle, and/or with incorrect tension on the restraining belts between the seat and the child.

Some seats include a mechanical level (such as a ball or bubble level) to aid the user in installing the seat at the proper angle, but bubble levels work on just one plane of orientation and these levels orient along only one dimension, typically pitch—the forward-to-back orientation of the seat, and the proper installation of a child seat can require that multiple planes of orientation be adjusted. For example, the side-to-side angle of the child seat ("roll") and the rotational orientation ("slip") also should be properly set. Bubble levels also cannot provide feedback on belt tension. Further, even where a child seat initially is installed properly the child seat may be jostled or shifted and tension may loosen over time.

Further, as the child uses the seat, the belt tension and orientation will change over time and needs to be corrected. Further, the proper tension and orientation may also change as the child grows and ages. Busy caregivers rarely stop to check seat installation, and thus a seat that was properly installed in the first instance will, over time, become improperly installed.

Further, children, particularly infants, have basic needs that the caregiver must supply, such as proper temperature, dryness and cleanliness. When the vehicle is in motion, the caregiver should not divert attention from operating the vehicle to check these conditions, as doing so poses a danger of a vehicular accident. Further, certain conditions simply cannot be checked from the driver's chair, such as the temperature in the back of a minivan, or where a toddler being potty-trained has wet herself.

Further, there are certain dangerous conditions which require multiple layers of alerting in case the primary caregiver does not respond. For example, where an infant is left in the vehicle, multiple individuals should be notified to maximize the chances of a rapid response to rescue the child.

Ordinary use of a family vehicle tends to dislodge the child seat from proper orientation and tension over time. The insertion and removal of cargo in the vehicle may bump the child seat, the child using the seat may move, or passengers in the vehicle may climb over and around the seat or use it for leverage in entering, exiting, or moving about in the vehicle. In the fast-paced life of a modern family, users may not have time to assess the problem, to say nothing of correcting it, again placing the children at increased risk of injury. The existing bubble levels provide no means for notifying the user that the child seat orientation is unsafely out of alignment, or that the belt tension is too loose.

Further, in the fast-paced life of a family, children using the child seat may be hastily buckled into their child seats, and the buckles may not latch properly. Also, older children often learn how to undo the safety restraints in the child seat, and may clandestinely unclasp or unbuckle themselves without the vehicle operator or passengers noticing. This again poses increased risk to the child.

SUMMARY

The following is a summary of the invention which should provide to the reader a basic understanding of some aspects of the invention. This summary is not intended to identify critical components of the invention, nor in any way to delineate the scope of the invention. The sole purpose of this summary is to present in simplified language some aspects of the invention as a prelude to the more detailed description presented below.

Described herein, among other things, is a system for providing notifications of a condition relating to a child in vehicular child seat, the system comprising: a sensor detecting a condition relating to a vehicular child seat or a child in the vehicular seat when the vehicular child seat is installed in a vehicle; a central hub comprising: a transmitter/receiver receiving from the sensor a first datagram containing information related to the detected condition; a microprocessor; a non-transitory computer-readable medium having programming instructions which, when executed by the microprocessor, cause a second datagram to be formed containing notification information, the notification information based at least in part upon at least some of the information related to the detected condition contained in the first datagram; a notification system receiving from the central hub the second datagram and conveying a notification to a user, the notification based at least in part upon at least some of the notification information in the second datagram.

In an embodiment of the system, the sensor is selected from the group consisting of: a three-axis accelerometer; a force transducer; and a temperature sensor.

In another embodiment of the system, the condition is selected from the group consisting of: the orientation of the vehicular child seat in the vehicle; the tension on a safety restraint belt; and, the air temperature near a child in the vehicular child seat.

In another embodiment of the system, the central hub is a vehicular telematics system.

In another embodiment of the system, the vehicular telematics system comprises a display and the notification system comprises the vehicular telematics system display.

In another embodiment of the system, the notification is a graphical element displayed on the display.

In another embodiment of the system, the notification system comprises a speaker and the notification comprises a sound emitted by the speaker.

In another embodiment of the system, the notification is a user-defined text message sent to a user-defined mobile telephone number.

In another embodiment of the system, the notification is a user-defined e-mail message sent to a user-defined e-mail address.

In another embodiment of the system, the non-transitory computer-readable medium further comprises notification hierarchy data comprising a plurality of notification addresses having associated notification priority data.

In another embodiment of the system, the non-transitory computer-readable medium further comprises programming instructions which, when executed by the microprocessor, select from the notification hierarchy one or more addresses, the selection based at least in part on the associated notification priority data for the selected one or more addresses.

In another embodiment of the system, each of the selected one or more addresses is a notification system receiving the second datagram and conveying a notification to a user, the notification based at least in part upon at least some of the notification information in the second datagram.

Also described herein, among other things, is a method for notifying a user of a condition related to a child in a child seat comprising the steps of: providing a child seat installable in a vehicle and comprising one or more sensors capable of detecting a condition related to a child when the child is in the child seat and the child seat is installed in the vehicle; providing a central hub; providing a notification system; one or more of the one or more sensors detecting a condition related to a child in the child seat when the child seat is installed in a vehicle; forming a first datagram comprising information related to the detected condition; transmitting the first datagram to the central hub in a first transmission; the central hub forming a second datagram comprising notification information, the notification information based at least in part upon at least some of the information related to the detected condition in the first datagram received by the central hub; transmitting the second datagram to the notification system in a second transmission; the notification system conveying a notification about the detected condition to a user, the notification based at least in part on at least some of the notification information in the second datagram received by the notification system.

In an embodiment of the method, the sensor is selected from the group consisting of: a three-axis accelerometer; a force transducer; and a temperature sensor.

In an embodiment of the method, the condition is selected from the group consisting of: the orientation of the vehicular child seat in the vehicle; the tension on a safety restraint belt; and, the air temperature near a child in the vehicular child seat.

In an embodiment of the method, the central hub is a vehicular telematics system comprising a display and the notification system is the vehicular telematics system display.

In an embodiment of the method, the method further comprises the steps of: providing a plurality of notification systems comprising the notification system; providing a notification hierarchy comprising notification addresses and notification priority data for each notification system in the plurality of notification systems; before transmitting the second datagram to the notification system in the second transmission, selecting the notification system from the plurality of notification systems, the selection based at least in part on the notification priority data associated with the notification system.

In an embodiment of the method, the notification hierarchy comprises notification addresses and notification priority data supplied by a user.

BRIEF DESCRIPTION OF THE DRAWINGS

FIGS. 8, 8A, 8B, 8C, 8D, 8E, 8F, and 9 show circuit diagrams of embodiments of a child seat orientation monitor.

DESCRIPTION OF PREFERRED EMBODIMENT

Although the present invention is described with particular reference to the accompanying drawings, it is to be understood at the outset that it is contemplated that the present invention may vary in specific detail from that illustrated and described herein while still achieving the desirable characteristics and features of the present invention. Accordingly, the description that follows is intended to be understood as a broad enabling disclosure directed to persons skilled in the applicable arts, and is not to be understood as being restrictive.

It should be noted that this description includes software. Software is typically stored in a non-transitory computer- or machine-readable media or memory. For the avoidance of doubt, terms used herein to describe or reference such media or memory, including without limitation "media," "storage media," "memory," and other such terms, expressly exclude transitory media such as signals and carrier waves whether or not the qualifier "non-transitory" is expressly recited.

Logic and Data Flow

Figure 1:
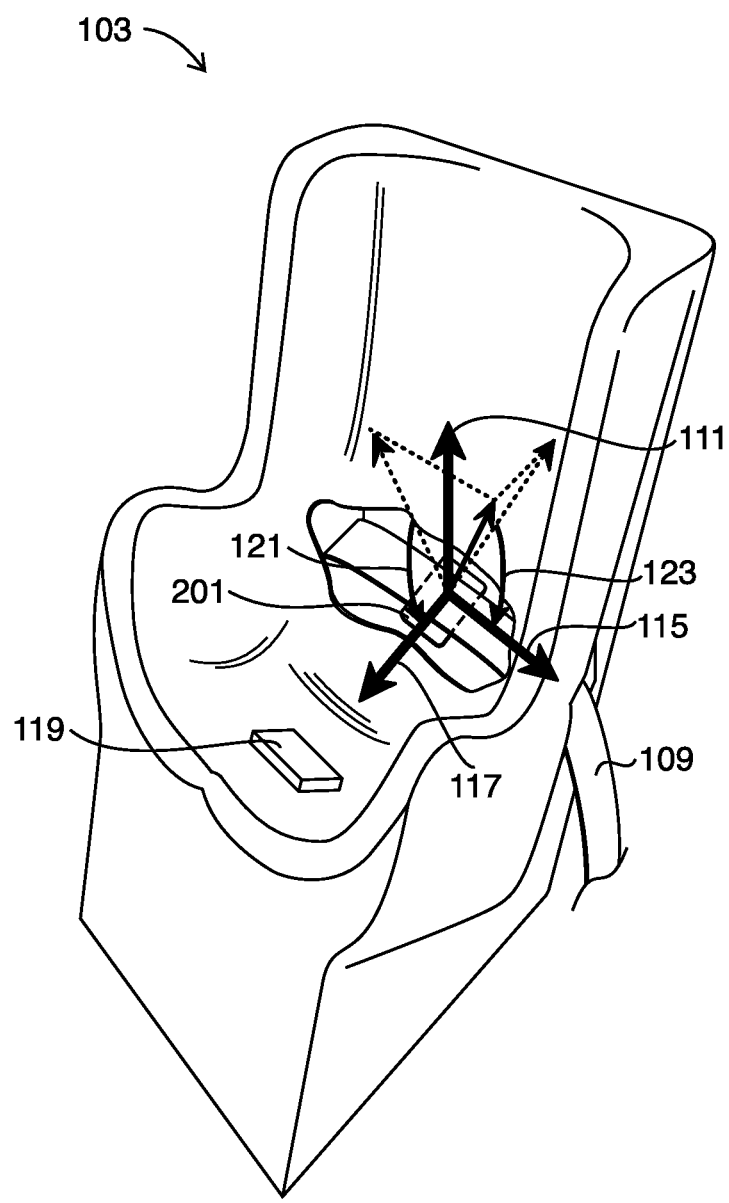
FIG. 1 shows an embodiment of a child seat orientation monitor in a child seat.
Figure 2:
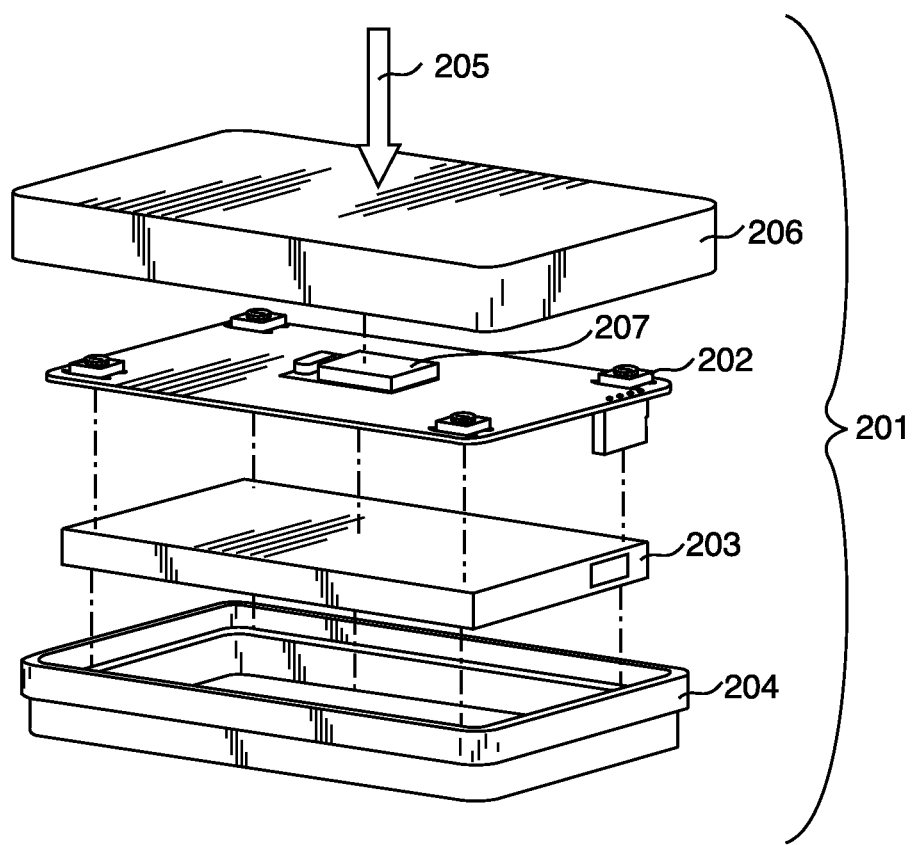
FIG. 2 shows an exploded view of an embodiment of a child seat orientation monitor.
Figure 3:
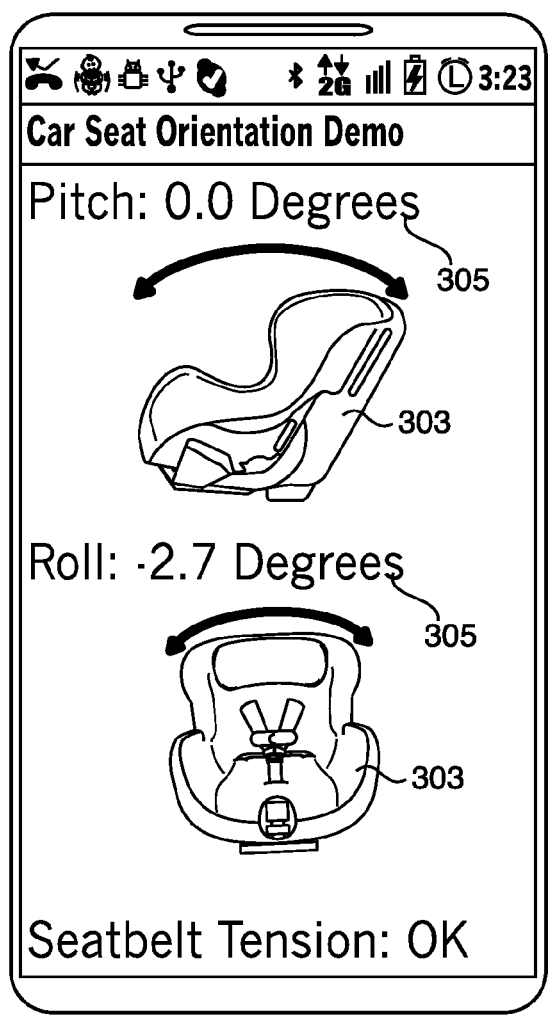
FIGS. 3 through 7 show embodiments of screenshots which can be presented to a user on a device, such as a smart phone, which provide indications of features and show alterations to the child seat orientation.
Figure 4:
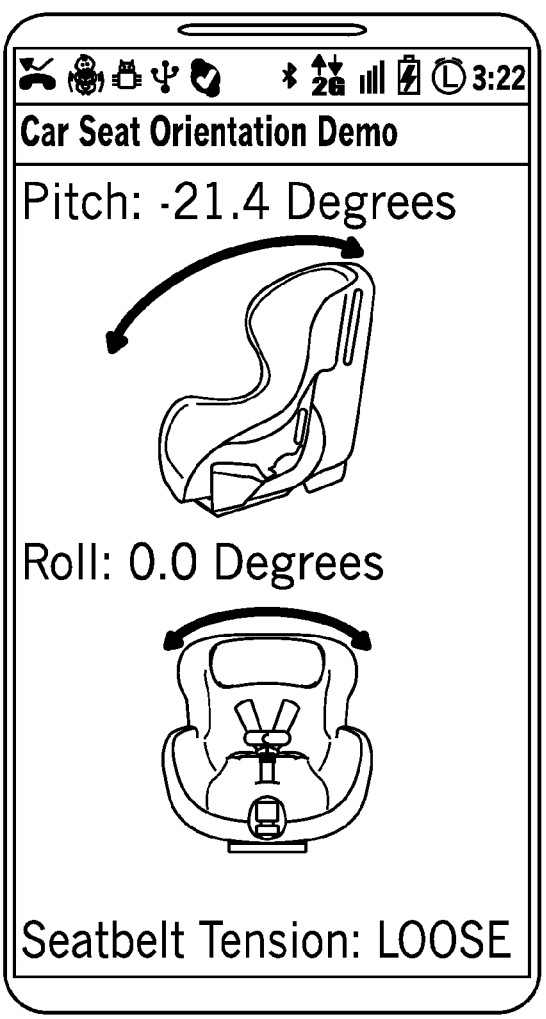
Figure 5:
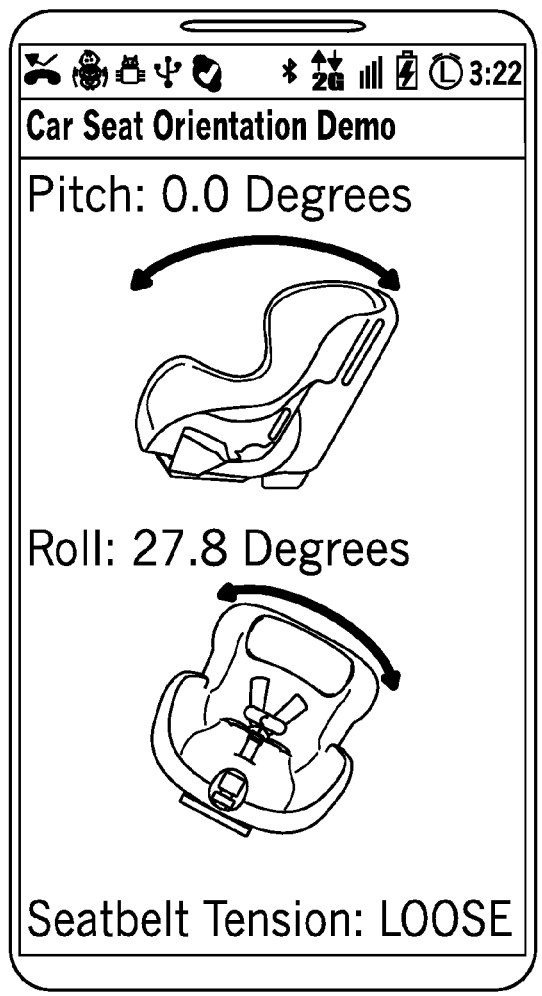
Figure 6:
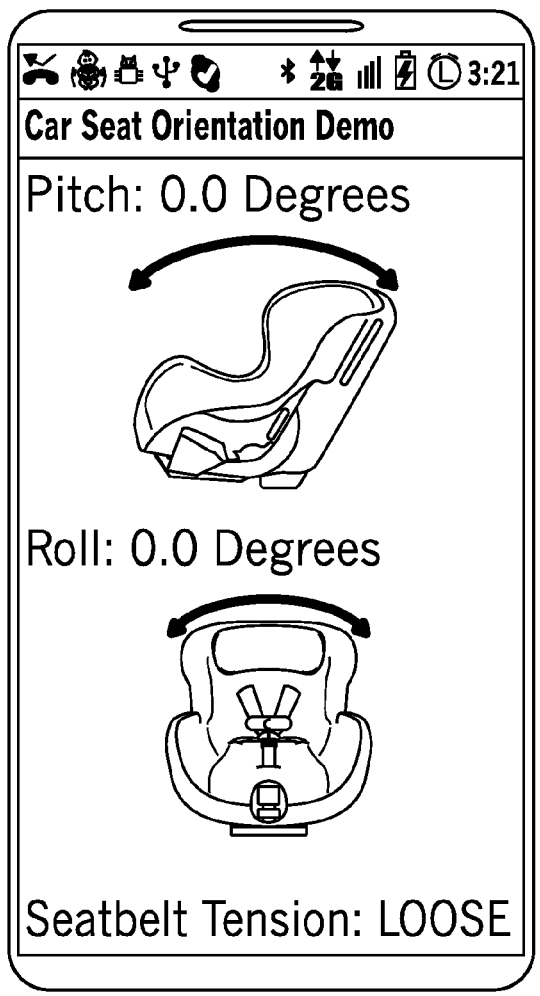
Figure 7:
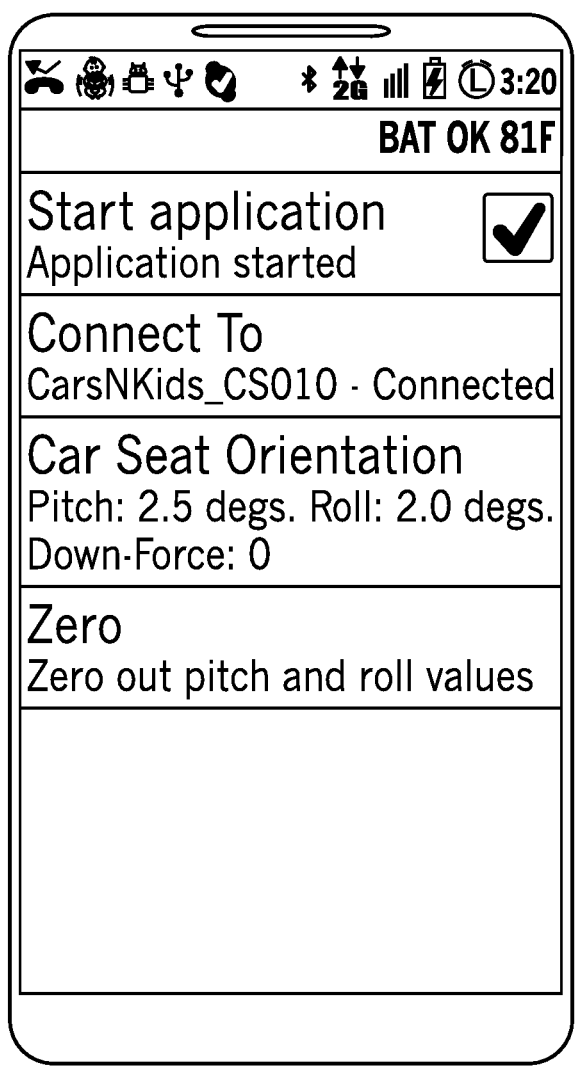
Figure 8B:
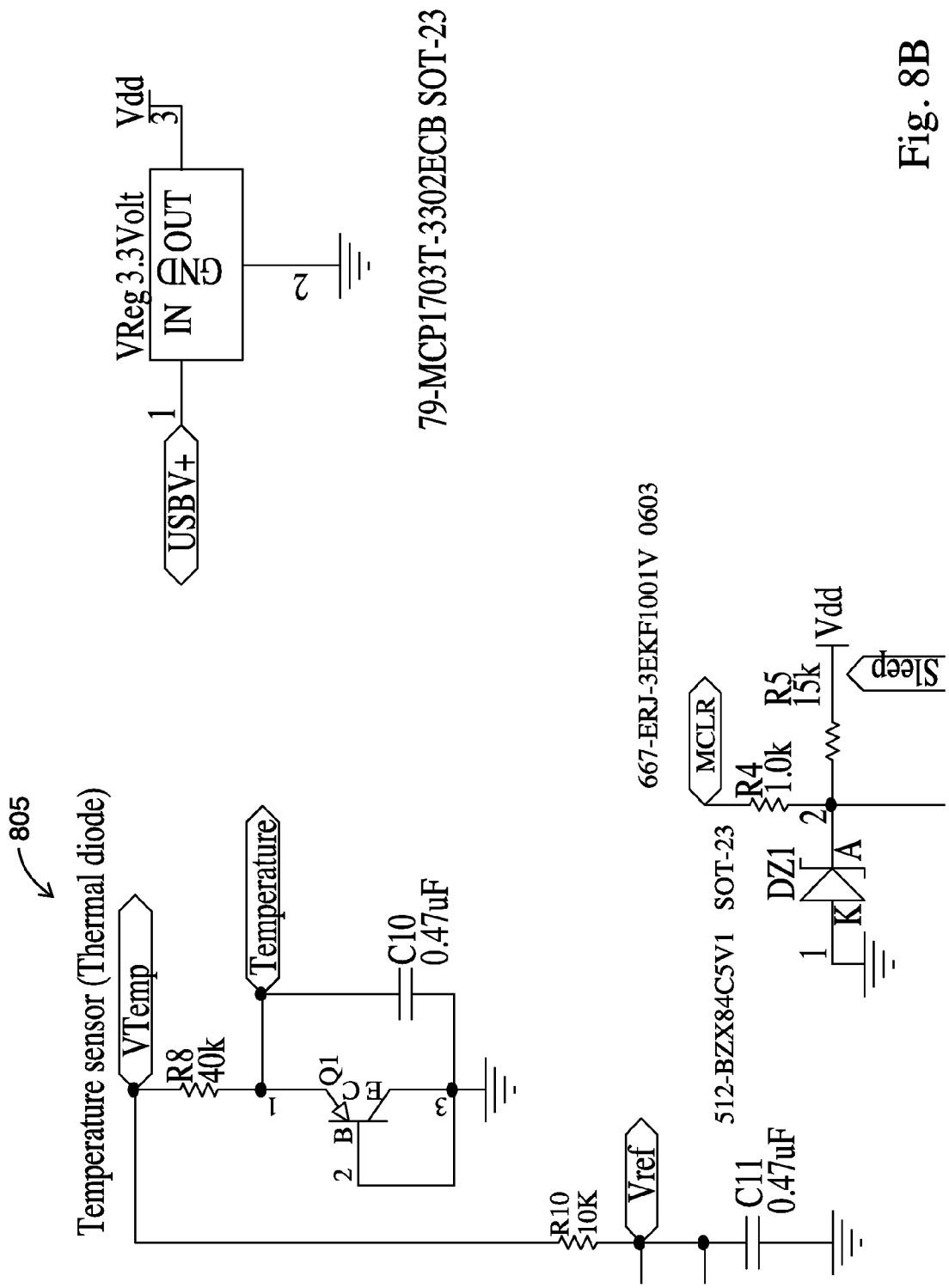
Figure 8C:
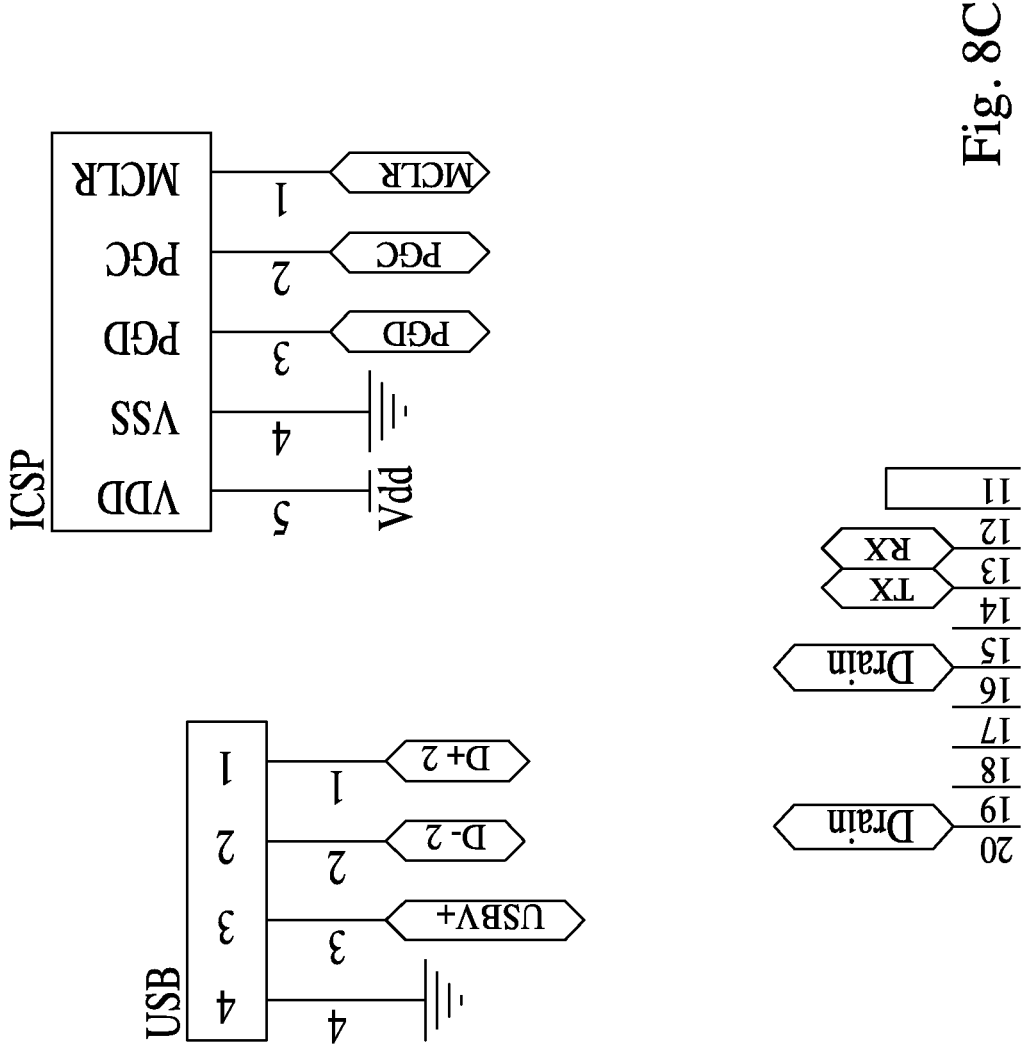
Figure 8D:
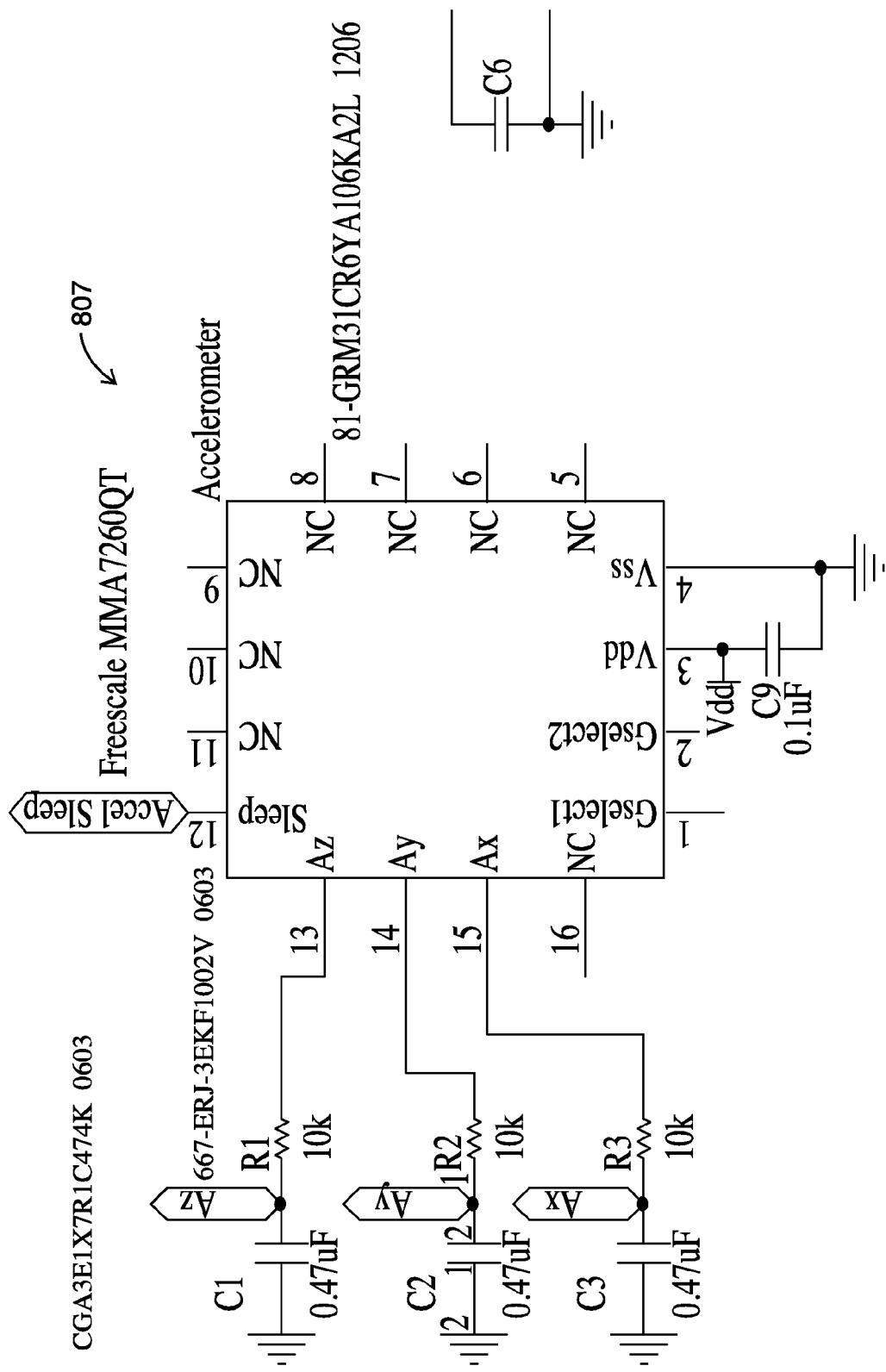
Figure 8E:
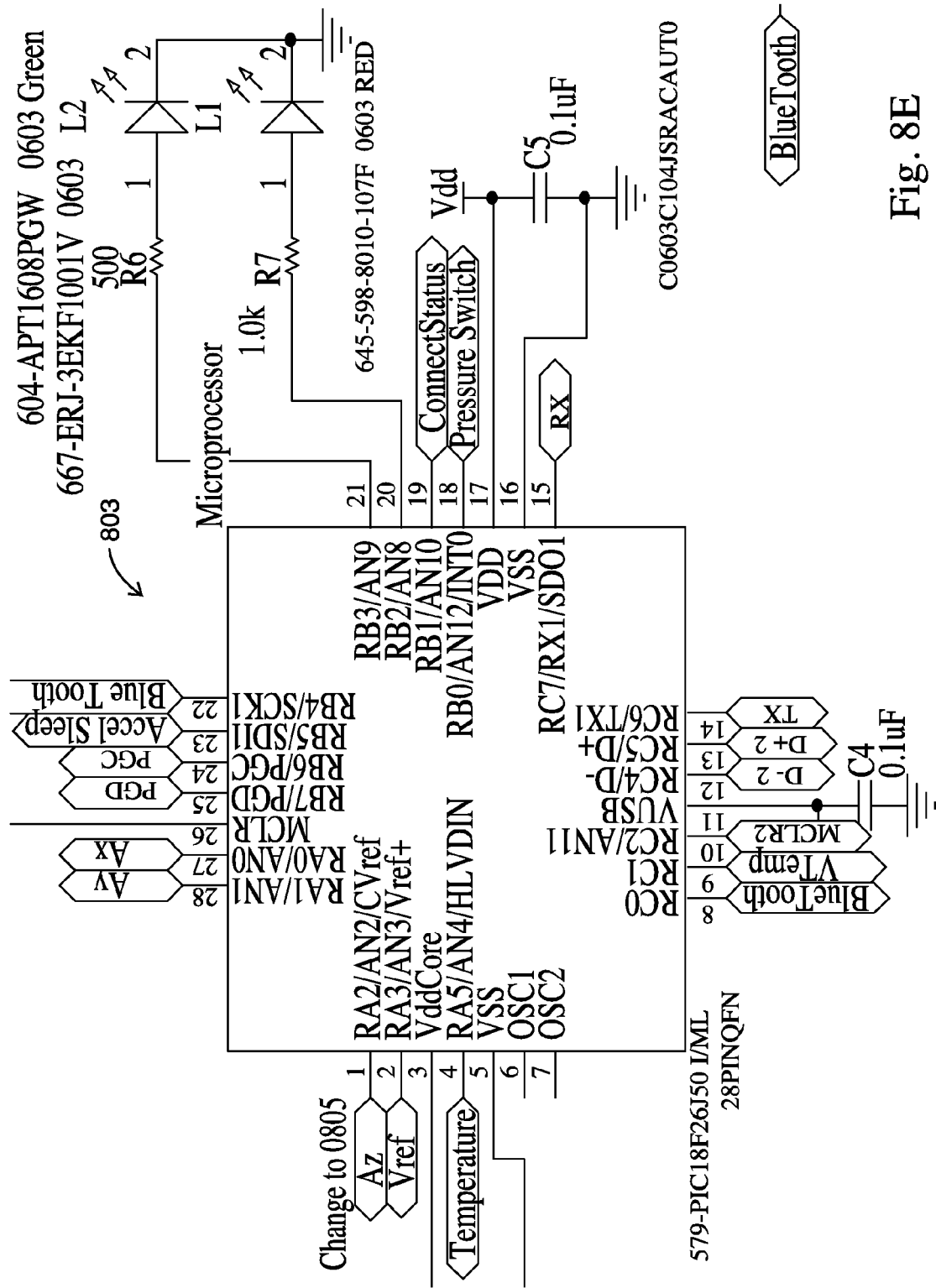
Figure 8F:
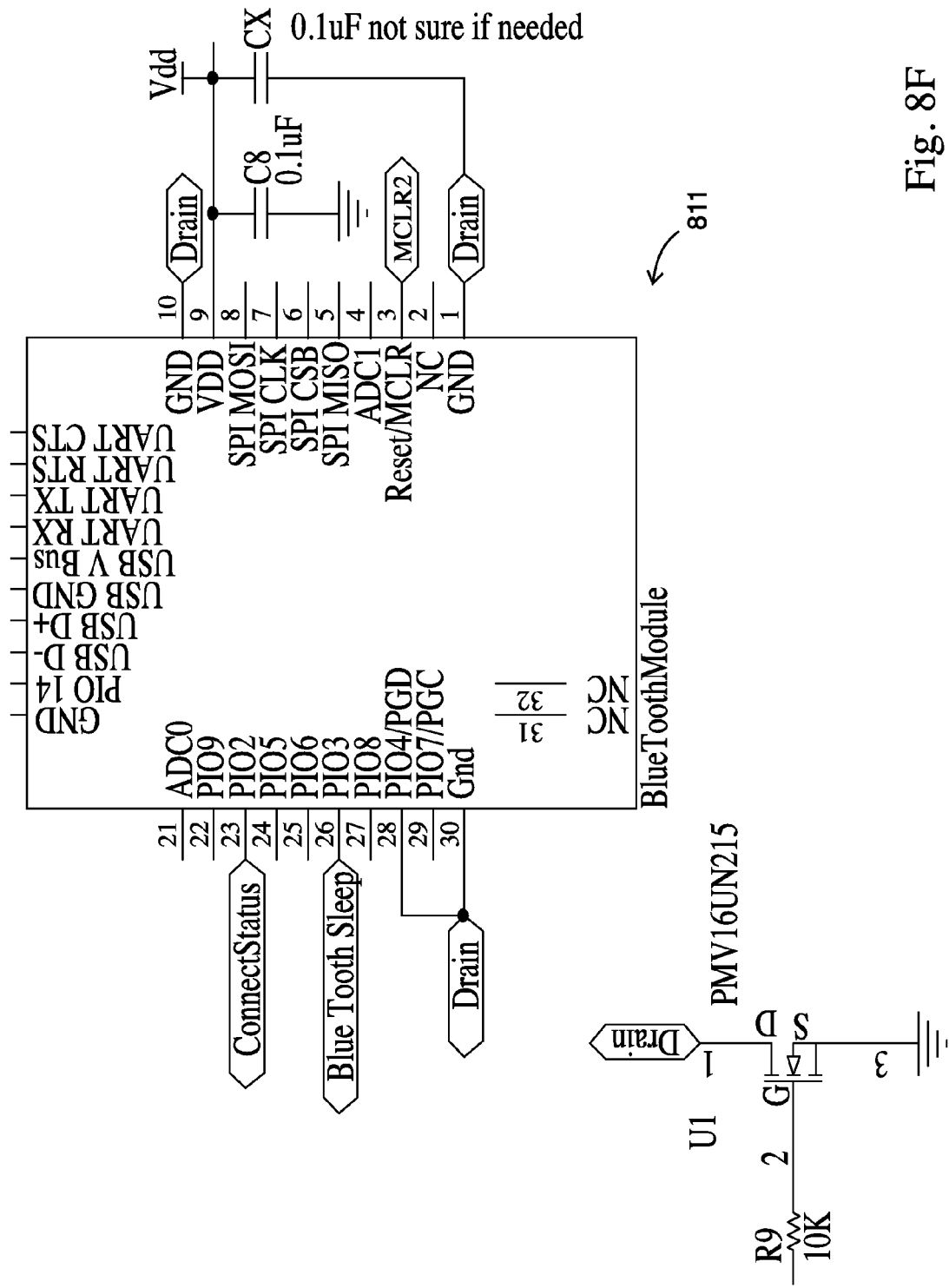
Figure 9:
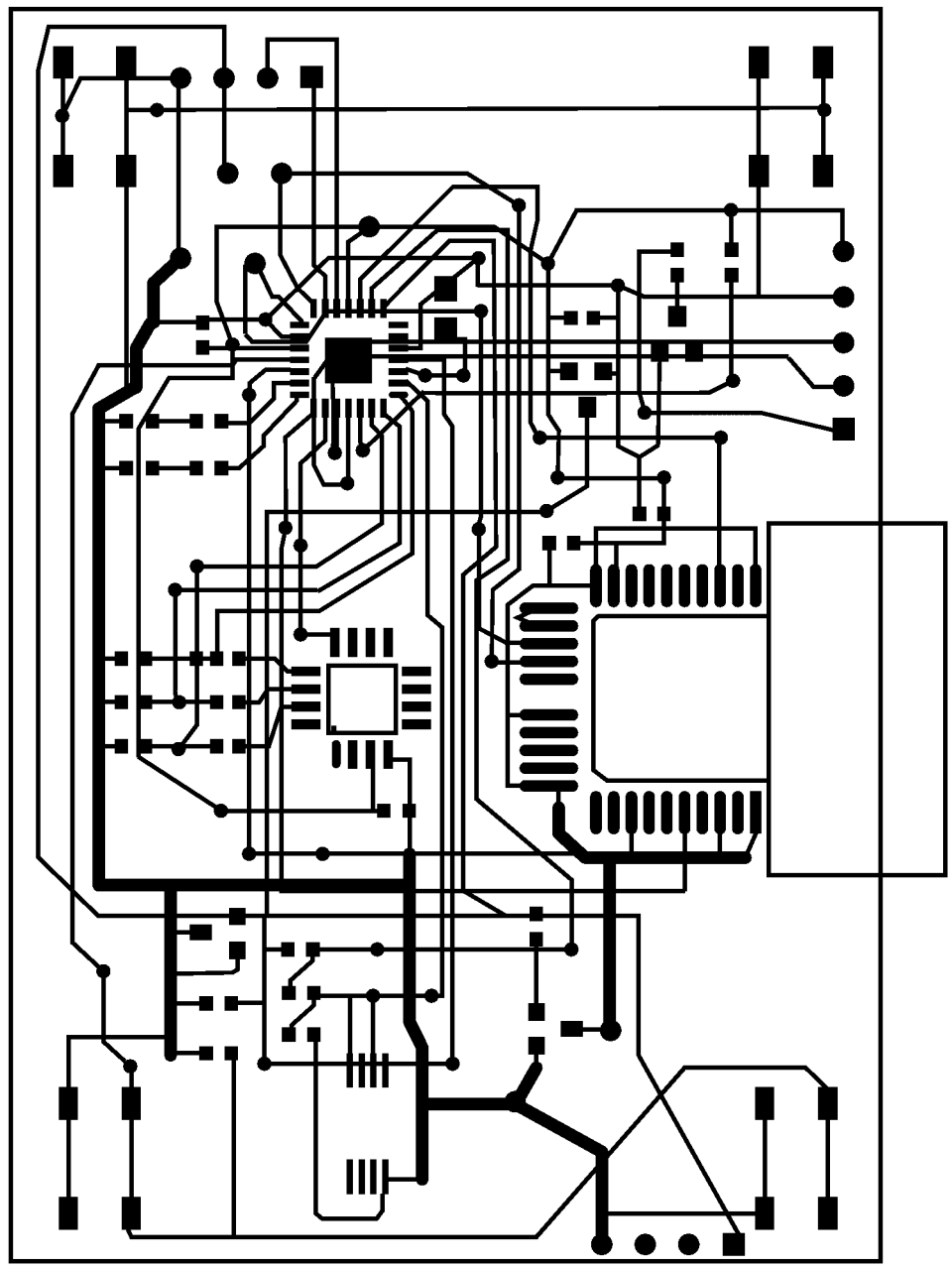
Figure 10:
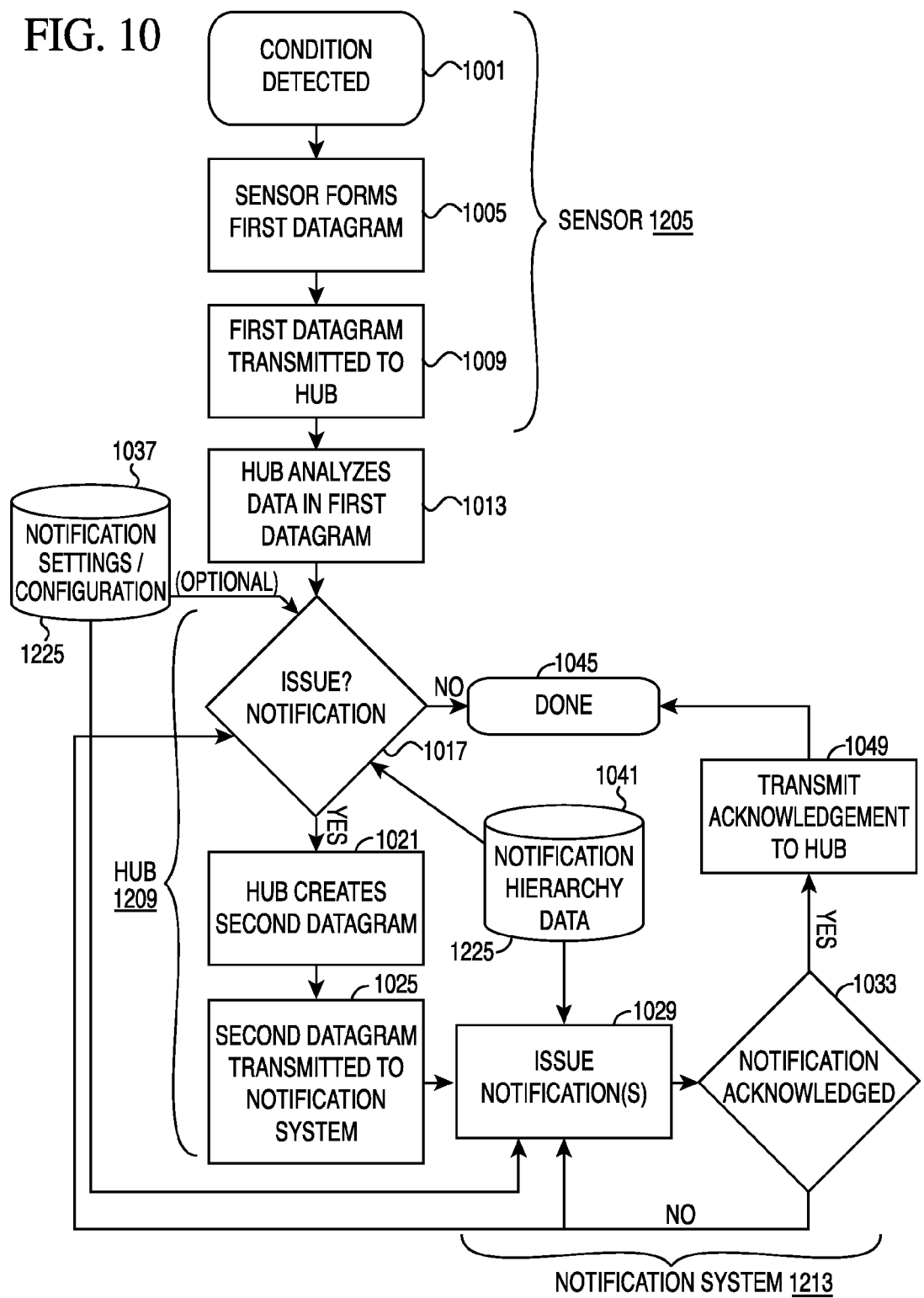
FIG. 10 shows a schematic diagram of data and logic flow in an embodiment of the systems and methods.

Generally, the systems and methods described herein include three primary component systems, though in an embodiment, they may further comprise additional components or component systems. The primary component systems are: a central processing hub; a monitoring system comprising one or more sensors; and, a notification system. Generally, the sensors are integrated into, or installed in or near, a child seat installed in a vehicle, and the sensors are wirelessly paired with a central hub. The central hub is generally a mobile device such as a mobile phone, e-reader, or tablet PC, or the central hub is part of a vehicular telematics system. When the sensors detect certain conditions relating to the health, safety, or status of a child in the child seat, the sensors transmit data about the detected condition to the hub, which then determines whether, how, and to whom to issue a notification of the condition. This determination may be based upon preprogrammed defaults, user configuration settings, and/or a notification hierarchy. The hub transmits data about the condition to a notification system, which is generally a visual display such as an LCD screen, and/or audio signals or cues emitted through an audio system. FIG. 10 depicts the general logical flow of the systems and methods, and the transfer and flow of some data created or used by the systems and methods, among these and other components.

In the depicted embodiment of FIG. 10, a condition (1201) is detected (1001), generally by a monitor or sensor (1205), and the sensor (1205) forms a first datagram (1005) containing information about the condition (1201). The condition (1201) generally relates to the health or safety of a child in a vehicular child seat (103) when the seat (103) is installed a vehicle. The first datagram (1005) is transmitted (1009) and (1207) to a central processing hub (1209). The central processing hub (1209) analyzes (1013) the contents of the first datagram (1005) and determines (1017) whether a notification pertaining to the condition (1201) should be issued. This determination (1017) is generally based at least in part on information about the condition (1205) contained in the first datagram (1005), and may optionally also be based at least in part on notification settings or configuration data (1037). If the program logic determines (1017) that a notification should not be issued, the primary logical flow of the systems and methods may conclude (1045), though additional functions or features may perform other or additional tasks, such as logging.

If the program logic determines (1017) that a notification should be issued, the hub (1209) creates a second datagram (1021) which generally includes at least some of the data about the condition from the first datagram (1005), and/or includes data based on at least some of the data about the condition from the first datagram (1005). The hub (1209) transmits (1025) the second datagram (1025) to a notification system (1213). The notification system (1213) then issues a notification (1029) to a user, caregiver, or other appropriate personnel. In certain embodiments, some conditions (1201) are considered urgent, and the systems and methods may continue to issue notifications (1029) of urgent conditions (1201) until the notifications (1029) are acknowledged (1033) by a user, and/or the urgent condition (1201) is no longer detected (1033) by the systems and methods.

When a notification is acknowledged (1033) by a user, a third datagram is created and transmitted (1049) to the hub (1209) to provide an indication to the hub (1209) that the notification has been acknowledged (1033). The hub (1209) may then determine (1017) that no further notifications of this condition (1201) should be issued, and the primary logical flow of the systems and methods may then conclude (1045), though additional functions or features may perform other or additional tasks, such as logging.

Alternatively, the hub (1209) may determine that notifications should continue to be issued. For example, where the detected (1001) condition (1201) is a child left in a child seat (103) in an otherwise empty vehicle and the notification system (1213) is a mobile device with a touch screen, a notification displayed on the touch screen may be inadvertently acknowledged (1033). This can happen, for example, where the touch screen contacts a sufficiently conductive surface to acknowledge (1033) the notification without the user ever becoming aware of the notification. In such circumstances, the hub (1209) may determine (1017) that the condition (1201) is sufficiently severe that notifications should continue to be issued (1029) despite the acknowledgment (1033) until the condition (1201) is no longer detected (1001). If the hub (1209) determines that notifications should continue to be issued, the hub (1209) repeats the process of forming another second datagram (1021) and transmitting (1025) it to a notification system (1213).

In an embodiment, the hub (1209) may determine (1017) how and when notifications should be issued, or continue to be issued, based upon a notification hierarchy (1041). A notification hierarchy (1041) is essentially data comprising contact information and associated priority information for given type or severity of condition (1201). This hierarchy is generally defined and provided to the systems and methods by the user and is stored in a non-transitory computer-readable storage medium (1225) as part of the configuration/settings (1037). In an embodiment, the notification hierarchy is an embodiment of the notification hierarchy contemplated by United States Utility patent application Ser. No. 13/835,498, filed Mar. 15, 2013, the entirety of which is incorporated by reference herein.

The notification priority data generally includes data indicating the order in which notifications should be sent, or attempted to be sent, to various addresses. Notification priority data may also comprise urgency thresholds, whereby if a condition or notification does not meet or exceed a given urgency threshold, notifications to a given address are skipped or suppressed. By way of example and not limitation, the user may configure the system to provide all notifications to the primary caregiver's mobile phone via an SMS text message, and to also provide urgent notifications to a secondary caregiver's mobile phone via an SMS text message. In an embodiment, notification priority data may also comprise a flag or indicator that the notification will continue to be sent unless acknowledged. In an embodiment, notification priority data may also comprise a flag or indicator that the notification will continue to be sent until the detected condition is no longer detected. In an embodiment, notification priority data may also comprise a flag or indicator that the notification will continue to be sent until the detected condition is no longer detected, regardless of whether the notification is acknowledged. Notification priority data is generally user-provided, but in an embodiment, notification priority data may also comprise preprogrammed or default values, such as contact information for local emergency personnel such as police, fire, EMT, poison control, or ambulance services.

Depending on the configuration settings (1037) and/or notification hierarchy (1041), the hub (1209) may form a different second datagram (1021) and may transmit (1025) it to a different notification system (1213). By way of example and not limitation, the condition detected (1001) may be a child left in a child seat (103) and the first notification system (1213) is an SMS text message sent to the mother's mobile phone, but the mobile phone is muted or powered off and the mother does not receive the message. When the condition (1205) remains unaddressed after a predetermined amount of time (e.g., a factory default setting or a user-configured value), the hub (1209) may attempt a second notification (e.g., repeat steps (1021), (1025), (1029), (1033), and/or (1049)) using another notification system (1213), such as sending an e-mail message to the father's business e-mail address. This type of notification hierarchy is a serial notification.

In an embodiment, a detected condition (1205) may result in parallel notifications, where invocations of the steps (1021), (1025), (1029), (1033), and/or (1049) are executed simultaneously (logically) for multiple notification channels or addresses. For example, the configuration data (1037) may indicate that certain detected (1001) conditions (1205), such as a child left in an empty vehicle, should result in attempts to notify multiple people through multiple channels. The configuration data (1037) may indicate that there are two notification systems (1213) for this condition: the hub (1209) shall send an SMS text message to the mother's mobile phone, and send an e-mail message to the father's business e-mail address. In this example, steps (1021), (1025), (1029), (1033), and/or (1049) would be carried out once to create (1021) and send (1025) a second datagram in the form of an SMS text message directed to the mother's mobile phone number (or create and send a second datagram which causes such an SMS text message to be sent to the mother's mobile phone). Steps (1021), (1025), (1029), (1033), and/or (1049) would be carried out an additional time to create (1021) and send (1025) a second datagram in the form of an e-mail message directed to the father's business e-mail address (or create and send a second datagram which causes such an e-mail message to be sent to the father's business e-mail address). The hub (1209) uses the configuration data (1037) and/or the notification hierarchy data (1041) to determine the communications channels and addressees of these notifications.

For purposes of this disclosure, the term "address" means an identifier or reference for a node, device, machine, interface, user, recipient, account, station, socket, or other endpoint of communication over a communications network. By way of example and not limitation, an address may be a telephone or telephony number, a text message number, an e-mail address, an instant message addressee username or other address identifier, a Facebook username or other Facebook user or page identifier, or any other form of identifier or reference to which communication may be addressed over a communication network.

In a further embodiment, a notification hierarchy (1041) may use a combination of serial and parallel notifications. By way of example and not limitation, continuing the example of a child left in a child seat (103), the first notification may be an SMS message sent to the mother's mobile phone, the second may be an e-mail message sent to the mother's business e-mail address and to the father's business e-mail address, and the third may be to place a call to local police and/or emergency responders with an automated text-to-voice message explaining the situation.

The preferred structure of the system and methods is the hub (1209) determines (1017) whether to issue a notification (1029). However, in alternative embodiments, the notification system (1213) may contain additional program logic to separately determine whether or when to display or convey notification data received by the notification system (1213). By way of example and not limitation, in an embodiment where the notification system (1213) is application software on a mobile phone which receives, processes, and conveys notifications, the application software may contain additional logic allowing the user to suppress or ignore certain types of notifications. For example, if the child seat (103) is vacant, the user may wish to temporarily disregard notifications that the child seat (103) safety restraint harnesses are not clasped.

Figure 12A:
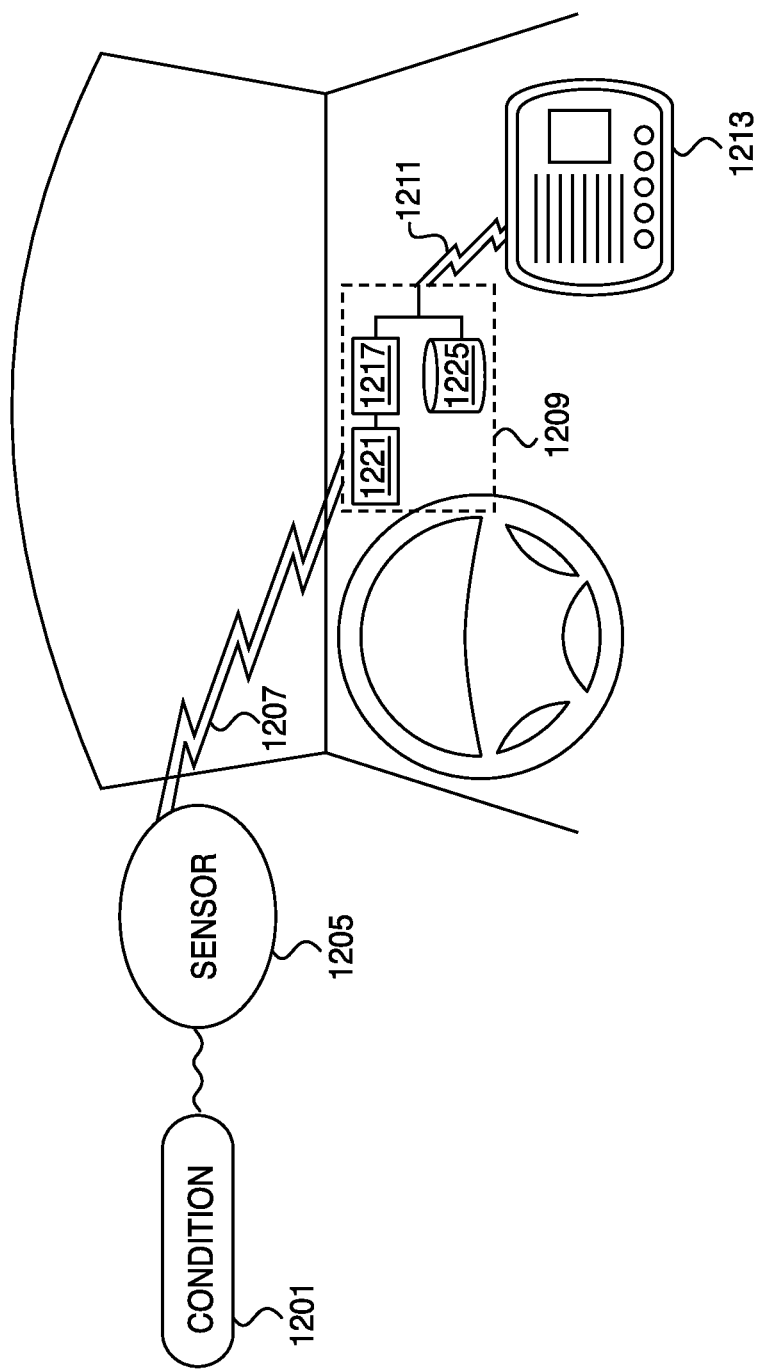
FIG. 12A shows a logical diagram of an embodiment of the systems and methods implementing through a vehicle telematics system.
Figure 12B:
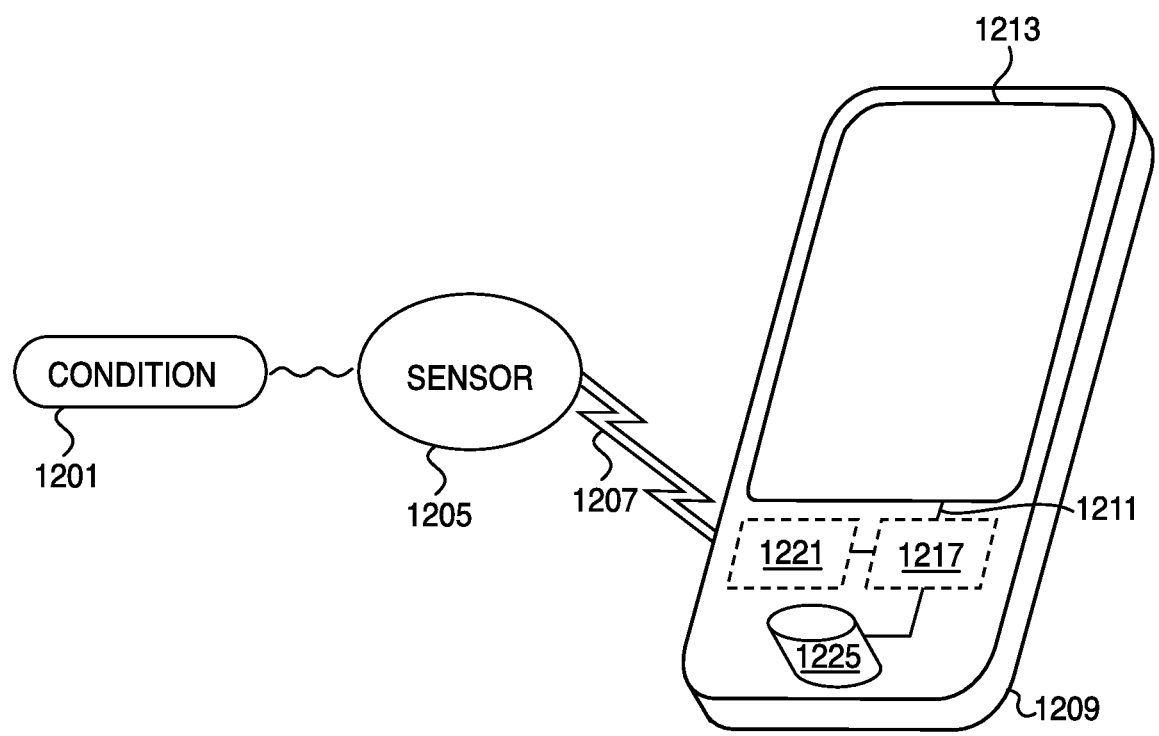
FIG. 12B shows a logical diagram of an embodiment of the systems and methods implementing through a mobile phone.
Figure 12C:
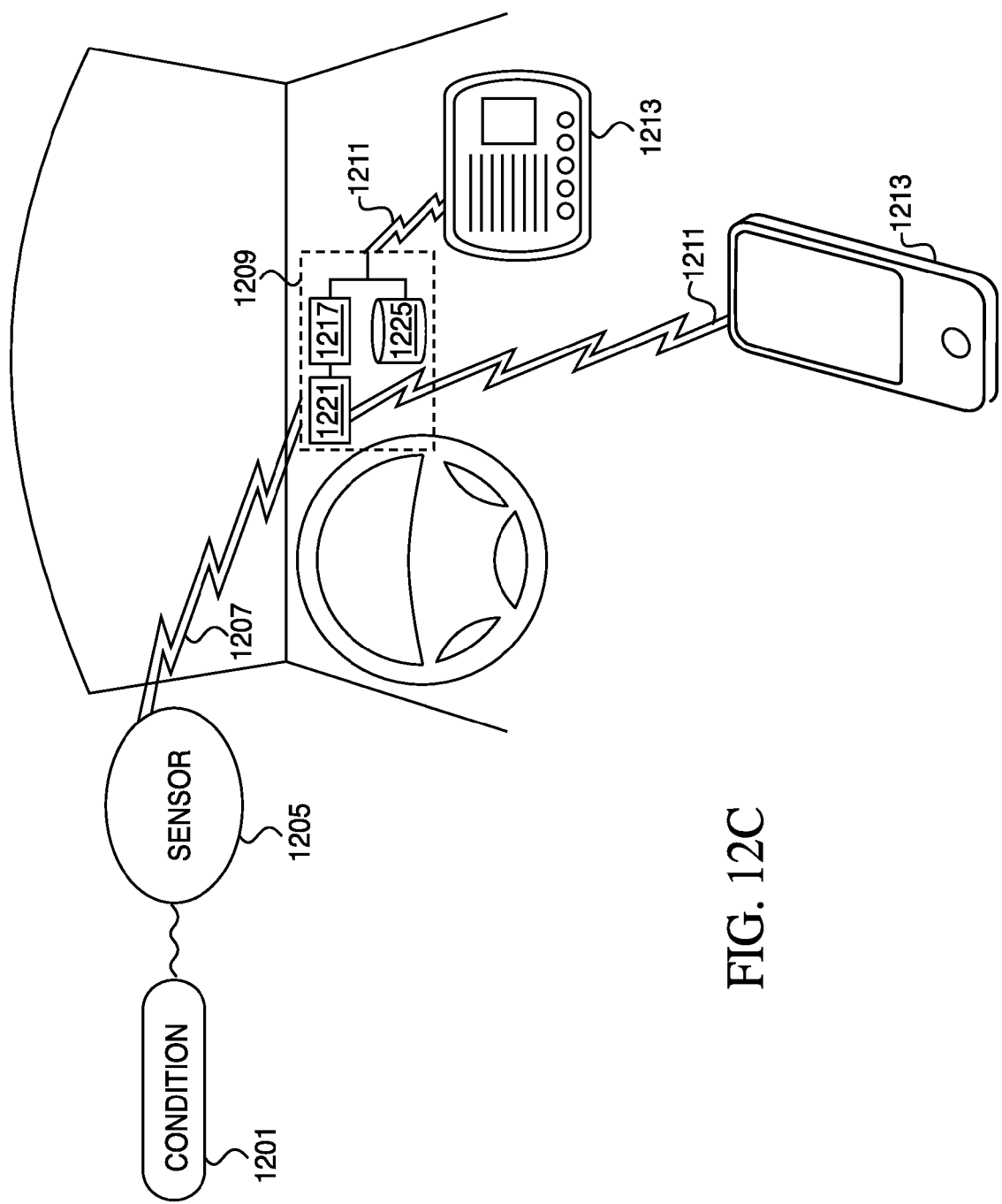
FIG. 12C shows a logical diagram of an embodiment of the systems and methods implementing through a vehicle telematics system and a mobile phone.

FIGS. 12A, 12B, and 12C provide logic diagrams for certain embodiments of the systems and methods. FIG. 12A depicts an embodiment of the systems and methods where the central processing hub (1209) and notification system (1213) are, or are part of, a vehicle telematics system. FIG. 12B depicts an embodiment of the systems and methods where the central processing hub (1209) and notification system (1213) are, or are part of, a mobile device. FIG. 12C depicts an embodiment of the systems and methods where the central processing hub (1209) is, or is part of, a vehicle telematics system and the notification system (1213) is, or is part of, a mobile device. Except where otherwise specifically designated, the descriptions herein of FIG. 12 describe each of FIG. 12A, FIG. 12B, and FIG. 12C. These diagrams should not be understood as limiting, but rather as exemplary embodiment of how the systems and methods might be implemented.

Generally, in each of the embodiments depicted in FIGS. 12A, 12B, and 12C, a condition (1201) related to the health or safety of a child in a child seat (103) is detected by a sensor (1205) monitoring a child seat (103), and/or the environment near a child seat (103), when the child seat (103) is installed in a vehicle. The sensors (1205) transmit (1207) data about the detected condition to a central processing hub (1209), which includes software to analyze the data received, process the data received, and determine whether a notification should be sent via the notification system (1213) and, if so, to whom and through which channels. If the hub (1209) determines that a notification should be sent, the hub (1209) transmits (1211) data to the notification system (1213), which may then notify a user or other appropriate personnel.

Sensing and Monitoring Systems

In a typical embodiment, the systems comprise a plurality of sensors (1205). The plural form "sensors" shall be generally used herein for sake of grammatical simplicity and readability, and should not be understood to imply or suggest that the monitoring system must comprise a plurality of sensors (1205). It is specifically contemplated that an embodiment may comprise a single sensor (1201).

The sensors (1205) generally transform a detected condition (1201) into a first datagram containing information about the detected condition (1201) and, optionally, additional data. The sensors then transmit (1207) the first datagram to the central processing hub (1209). It will be understood by one of ordinary skill in the art that the sensors (1205) may comprise additional components including but not necessarily limited to: electronic circuitry or digital logic for transforming the detected condition (1201) into data; a transmitter for transmitting (1207) that data to the central hub (1209); and a bus to move data among components within a sensor (1205).

The first datagram may contain additional data besides information about the detected condition (1201). This additional data may include, without limitation: identification data, including but not limited to the serial number, hardware address, network address, or other identifiers for distinguishing or identifying the originating sensor (1205); occurrence data, including but not limited to the time of day or geographic location at which that the condition was detected; and session/security data, including but not limited to a key or other data to identify and/or secure the endpoints of a communication, such as a wireless transmission protocol.

There are two major categories of conditions (1201) detected by the sensors: true/false conditions, and quantitative measurements. By way of example and not limitation, true/false conditions (1201) include whether a safety restraint harness is properly engaged, whether a child has vacated the child seat, whether the vehicle is in motion, and whether the child seat is properly installed in the vehicle. Also by way of example and not limitation, quantitative conditions (1201) generally measure conditions capable of quantification, such as temperature, sunlight, moisture, noise level, orientation angle, and belt tension. Both categories of conditions (1201) are generally transmitted (1207) to the hub (1209), regardless of the value detected, and the hub (1209) performs the logic to determine whether the data indicates a notification of the detected condition (1201) should be sent.

Among other things, a sensor (1205) may sense or detect conditions (1201) including, but not limited to: internal vehicle temperature; internal vehicle humidity; external temperature; external humidity; internal vehicle air pressure; external air pressure; presence or concentration of certain gases in the vehicle, including but not limited to, gases which may pose health risks, such as carbon monoxide and carbon dioxide; presence or level of moisture or wetness, particularly in the form of liquid; presence or level of sound or noise within the vehicle, including, but not limited to, the decibel level of such sound or noise; presence or level of particular types of sound or noise, including, but not limited to, an infant or toddler cry; motion within the vehicle; motion outside the vehicle; vehicle itself in motion, including, but not limited to, direction, velocity, and duration of motion; motion of a child in a child seat (103), including, but not limited to, rhythmic or other cyclical motion indicative of breathing, chewing, or sleeping; presence of a child in a child seat (103); orientation of a child seat (103) in a vehicle; presence or intensity of light in the vehicle; presence or intensity of air movement in the vehicle; tension on a belt holding a child seat (103) to a vehicle; tension on a safety restraint harness holding a child to a child seat (103); pressure or weight of a child in a child seat (103); presence or level of light or brightness near a child seat (103); status or condition of a sensor (1205) or other component; remaining battery life of a sensor (1205) or other component; wireless network signal strength. Some of these conditions are described in further detail herein.

In an embodiment, a sensor (1205) may be or include an embodiment of the child seat orientation monitoring system, the temperature sensor, the light sensor, the belt tension sensor, a sensor detecting the tension of the safety restraint harness restraining a child in a child seat, or the breathing sensor contemplated by U.S. Utility application Ser. No. 13/648,949, filed Oct. 10, 2012. In an alternative embodiment, a sensor (1205) may be or include an embodiment of the pressure sensor contemplated by U.S. patent application Ser. No. 12/335,421, filed Dec. 15, 2008; 61/013,929 filed Dec. 14, 2007; 61/441,199, filed Feb. 9, 2011; 61/504,113, filed Jul. 1, 2011; and 61/538,647, filed Sep. 23, 2011. The entire disclosures of all such documents are incorporated herein by reference.

When a sensor (1205) detects a condition (1201), the sensor (1205) generally creates, or causes to be created, a first datagram, and transmits (1207) the first datagram through a first transmission (1207) to a central hub (1209). The first datagram will often, but not necessarily always, comprise at least some information about the detected condition (1201). There are multiple operational modes that may be used. For example, in an embodiment, a sensor (1205) monitoring for a condition (1201) continually forms first datagrams about the condition (1201) being monitored, and transmits (1207) those first datagrams to a central hub (1209). In such an embodiment, the hub (1209) receives notification not only of when the condition (1201) is detected, but when it is not. In an alternative embodiment, a sensor (1205) forms a first datagram and transmits (1207) the first datagram to the hub (1209) only when a certain condition (1201) is detected. In a still further embodiment, both of these operational modes are used simultaneously by one or more sensors (1205). It is generally preferred that the continuous notification mode be used, so that the hub (1209) can detect not only when a condition (1201) occurs, but when it terminates or changes.

It is specifically contemplated that the first transmission (1207) may be a wireless transmission between/among a plurality of devices using a wireless communication protocol including, but not limited to: a satellite, cellular, or mobile phone communication system; a long-range wireless data communication system such 3G, 4G, LTE, and other long-range wireless data protocols; a short-range wireless data communication system such as Bluetooth®, IEEE 802.11, and other short-range wireless data protocols.

It is also specifically contemplated that the first transmission (1207) may be a wired transmission between/among a plurality of devices, or a plurality of components of a device, physically coupled by one or more external cabling systems such as USB, IEEE 1394/FireWire®, or a power/charging cable.

It is also specifically contemplated that the first transmission (1207) may a wired transmission between/among a plurality of devices, or a plurality of components of a device, physically coupled by one or more buses, including but not limited to: data storage transmission cables such as ATA/SATA/eSATA; video transmission cables such as HDMI, DVI, VGA, RCA, and component video; any other cabling system. It is also specifically contemplated the first transmission (1207) may be a wired transmission between devices, or a components of a device, over a local bus, internal bus, system bus, or other electric bus, including but not limited to a printed circuit board. It is also specifically contemplated that the first transmission (1207) may be a combination of wired or wireless communications using any combination of the bus systems described here or otherwise known or in the future developed in the art.

The Central Processing Hub

Each sensor (1205) is generally bonded or paired with a central processing hub (1209), typically as part of the installation or setup of the system. One of ordinary skill in the art will understand the terms "bonding" and "pairing" to mean a process by which a plurality of devices establish a wireless communication session. This has several advantages and simplifies the systems significantly as elsewhere described here with respect to notification systems.

Figure 11:
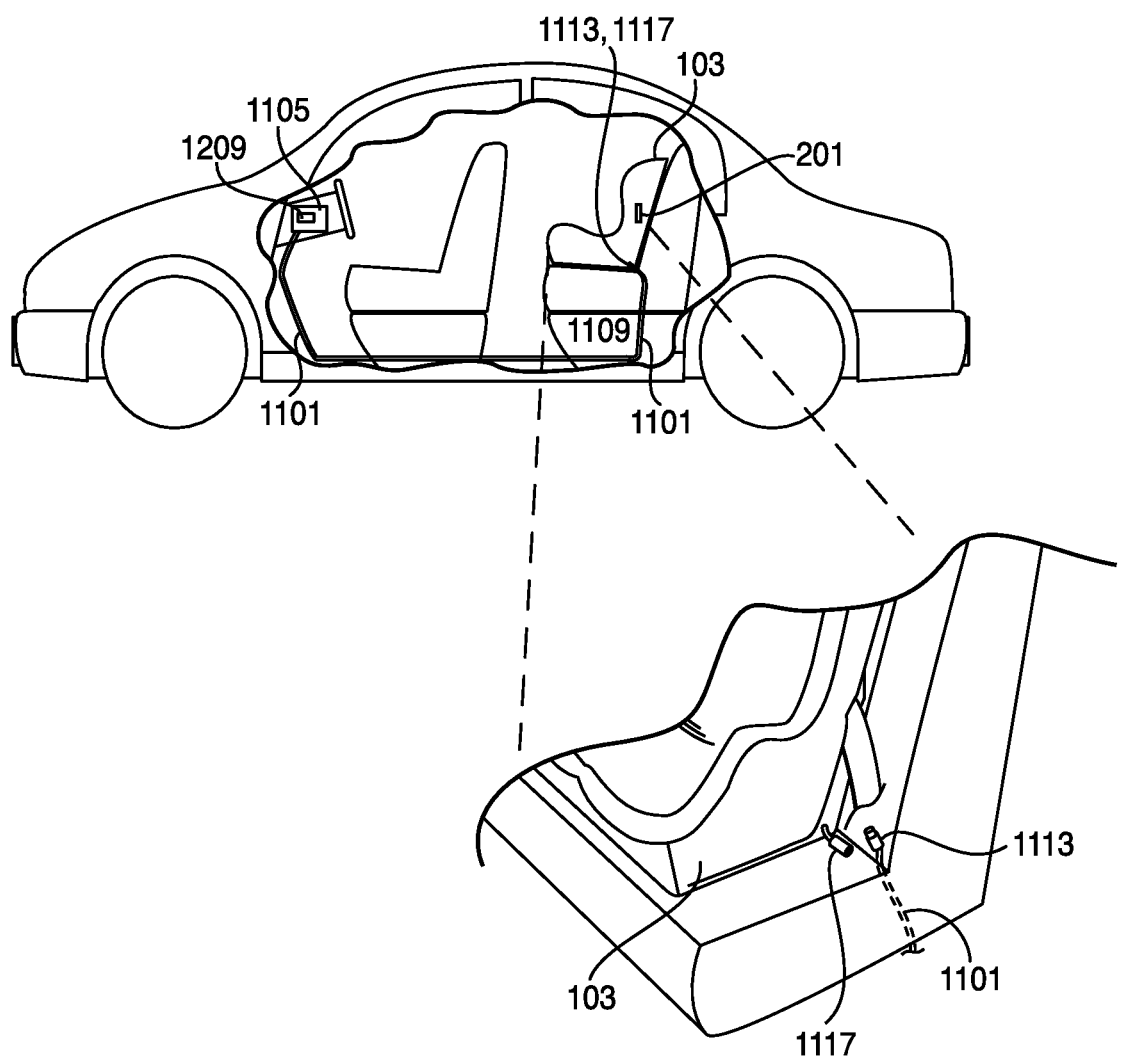
FIG. 11 shows a diagram of an embodiment of the systems and methods implemented through a vehicle telematics system.

Although wireless communication between a sensor (1205) and hub (1209) are preferred, it is specifically contemplated that a sensor (1205) or group of sensors (1205) may instead be connected to a hub (1209) through a wired connection. For example, in the embodiment depicted in FIG. 11, the hub (1209) is, or is part of, a vehicle telematics system (1105). In the depicted embodiment, the vehicle may include one or more physical wires (1101) with a proximal end connected to the telematics system (1105) and one or more terminal ends having a connector (1113). A terminal end of the wire (1101), and thus the connector (1113), will generally be proximate to an installation point for a child seat (103), such as the back row of a sedan, the middle or back row of a mini-van, or near a LATCH or other anchoring system. The connector (1113) is generally designed for storage in the cavity of the vehicle seat between the upright portion of the seat and the lateral portion. This protects the connector (1113) from damage when not in use and is aesthetically desirable, similar to LATCH and other anchoring systems, which are also generally hidden in such cavities. The sensors (1205) in such an embodiment are similarly wired to a second connector (1117) configured for mating with the first connector (1113). When the child seat (103) is installed in the vehicle, the child seat connector (1117) is plugged into the vehicle connector (1113) to establish the wired connection between the telematics system/hub (1105) and (1209) and the sensors (1205). This system has the advantage of a more stable and reliable connection than a short-range wireless connection, less likelihood of interference from external sources, and simpler configuration. Further, in an embodiment, a wire (1101) can power or charge the sensor (1205), eliminating the need for a battery as the primary power source.

The central processing hub (1209) includes most of the software and programmatical logic of the systems and methods, and will generally be, or be integrated into, a vehicle telematics system (FIG. 12A), a mobile device (FIG. 12B), or both (FIG. 12C). The hub (1209) generally comprises a logic unit or microprocessor (1217), a wireless transmitter/receiver (1221), and may optionally include a non-transitory computer-readable data storage system (1225). This system (1225) may be integrated into the hub (1209), directly attached to the hub (1209), or indirectly attached to the hub (1209). The hub (1209) also generally comprises one or more software components or modules in the form of computer-readable instructions stored on a non-transitory computer-readable memory or storage media. It will be understood by one of ordinary skill in the art that the hub (1209) will generally comprise additional components including, but not necessarily limited to, a bus to move data among components within the hub (1209).

The storage (1225) is generally contemplated to be or include one or more storage devices internal to or integrated with other components of the system, but in an embodiment, the storage (1225) may be external storage connected or connectable to the hub (1225), by wire or wirelessly, over a network. By way of example and not limitation, such storage (1225) includes NAS and SAN, as well as cloud and distributed storage.

When the hub (1209) receives a first datagram, the logic unit (1217) processes the first datagram to extract from the first datagram, and analyze, information about the detected condition (1201). This analysis comprises determining, generally based at least in part on the information in the first datagram about the condition (1201), whether a notification should be issued. In addition, the hub (1209) may be programmed to also base the determination whether to issue a notification on other data, including but not necessarily limited to factory default settings and user-provided configuration data, such as a notification hierarchy (1049). In an embodiment, the notification hierarchy (1049) may be or include the escalation hierarchy contemplated by U.S. Utility application Ser. No. 13/835,498, filed Mar. 15, 2013, the entirety of which is elsewhere herein incorporated by reference.

The program logic to access and use the data in the first datagram is generally implemented as software instructions stored in a non-transitory computer-readable medium. The instructions are generally processed and executed by the logic unit (1217), but may, in an embodiment, be hard-wired, such as via an integrated circuit or printed circuit board. The specific conditions under which the program instructions cause a notification to be generated will generally vary depending upon the type of condition detected, default thresholds and settings, and/or user-customized thresholds and settings. These default and/or user-defined thresholds and settings are generally stored in a storage medium (1225), accessed by the logic unit (1217), and are generally used when the logic unit (1217) processes a first datagram.

When the hub (1209) determines that a notification should be generated, the hub (1209) generally creates a second datagram and transmits (1211) the second datagram through a second transmission (1211) to a notification system (1213). The second datagram will often, but not necessarily always, comprise, or be based on, at least some of the information about the detected condition from the first datagram. The second datagram may also comprise additional information, including but not limited to the additional information described herein with respect to the first datagram, such as status information. The format of the second datagram may be the same or different from the first datagram, and will generally comprise a system-specific or open protocol embedded within another communications protocol. The second transmission (1211) may be wireless or wired.

It is specifically contemplated that the second transmission (1211) may be a wireless transmission between/among a plurality of devices using a wireless communication protocol including, but not limited to: a satellite, cellular, or mobile phone communication system; a long-range wireless data communication system such 3G, 4G, LTE, and other long-range wireless data protocols; a short-range wireless data communication system such as Bluetooth®, IEEE 802.11, and other short-range wireless data protocols.

It is also specifically contemplated that the second transmission (1211) may be a wired transmission between/among a plurality of devices, or a plurality of components of a device, physically coupled by one or more external cabling systems such as USB, IEEE 1394/FireWire®, or a power/charging cable.

It is also specifically contemplated that the second transmission (1211) may a wired transmission between/among a plurality of devices, or a plurality of components of a device, physically coupled by one or more buses, including but not limited to: data storage transmission cables such as ATA/SATA/eSATA; video transmission cables such as HDMI, DVI, VGA, RCA, and component video; any other cabling system. It is also specifically contemplated the second transmission (1211) may be a wired transmission between devices, or a components of a device, over a local bus, internal bus, system bus, or other electric bus, including but not limited to a printed circuit board. It is also specifically contemplated that the second transmission (1211) may be a combination of wired or wireless communications using any combination of the bus systems described here or otherwise known or in the future developed in the art.

In the depicted embodiment of FIG. 12A, the central processing hub (1209) is, or is part of, a vehicular telematics system. Vehicular telematics systems are generally computers integrated into vehicles and typically include a microprocessor (1217), short- and/or long-range wireless transmitters/receivers (1221), a non-transitory computer-readable storage medium (1225), and a display (1213). Telematics displays (1213) are generally LCD or other monitors embedded in the vehicle cabin and connected to the hub (1209) and/or its other components by a display cable.

In the depicted embodiment of FIG. 12A, sensors (1205) pair with the vehicle telematics system hub (1209) and the first datagram is transmitted (1207) wirelessly from the sensor (1205) to the vehicle telematics system (1209). The vehicle telematics system (1209) microprocessor (1217) processes the first datagram and determines, as described elsewhere herein, whether to issue a notification. If a notification is to be issued, the vehicle telematics system (1209) microprocessor (1217) creates the second datagram and transmits (1211) it to the vehicle telematics system (1209) display (1213), which serves as the notification system (1213) in the depicted embodiment of FIG. 12A. In this embodiment, the second transmission (1211) will generally be a wired data transmission (1211) across a combination of an internal data bus and a display cable bus within the vehicle telematics system (1209).

By way of example and not limitation, vehicular telematics systems (1209) include both factory and after-market systems such as: OnStar; mbrace; BMW Assist; Lexus Enform; Toyota Safety Connect; Ford Sync; Hyundai BlueLink; Infinity Connection; AcuraLink; Kia UVO; and Garmin devices.

In an alternative embodiment, such as the embodiment depicted in FIG. 12B, the hub (1209) is implemented via a mobile device (1209), such as a mobile phone or tablet. Such mobile devices (1209) generally include a microprocessor (1217), short- and long-range transmitter/receivers (1221), a non-transitory computer-readable storage medium (1225), and a display (1213). Mobile device (1209) displays (1213) are typically LCD monitors integrated into the device (1209) and connected to the other mobile device (1209) components by a display cable.

In the depicted embodiment of FIG. 12B, the sensors (1205) pair with the mobile device (1209) and the first datagram is transmitted (1207) wirelessly from the sensors (1205) to mobile device (1209). The mobile device (1209) microprocessor (1217) processes the first datagram and determines, as described elsewhere herein, whether to issue a notification. If a notification is to be issued, the mobile device (1209) microprocessor (1217) creates the second datagram and transmits (1211) it to the mobile device (1209) display (1213), which serves as the notification system (1213) in the depicted embodiment of FIG. 12B. In this embodiment, the second transmission (1211) will generally be a wired data transmission across a combination of an internal data bus and a display cable bus within the mobile device.

By way of example and not limitation, mobile devices (1209) include: mobile phones, such as iPhones, Windows phones, Galaxy phones, Google phones, and Android devices; tablet PCs, such as iPads and Microsoft Surface; e-readers, such as Kindle devices, other hand-held devices with similar functional capability.

It should be further noted that the trend in digital electronics product development is towards wider integration of features and functionality into fewer multipurpose, multi-functional devices. As such, the distinction between a vehicular telematics system, such as that depicted in FIG. 12A, and a mobile device, such as that depicted in FIG. 12B, may sometimes blur. For example, the vehicle telematics display of FIG. 12A may be a tablet PC that can be removed from the vehicle and taken with the driver for use as a general or specific-purpose tablet computer. In an alternative embodiment, the vehicle telematics system itself may be implemented via a tablet PC that plugs into the vehicle when in use. Such embodiments are specifically contemplated herein.

In a still further embodiment, such as the embodiment depicted in FIG. 12C, the system is implemented via both a vehicle telematics system and mobile device. In the depicted embodiment of FIG. 12C, the vehicle telematics system (1209) is or includes the hub. The sensors (1205) pair with the vehicle telematics system (1209) and the first datagram is transmitted (1207) wirelessly from the sensors (1205) to the vehicle telematics system (1209). The vehicle telematics system (1209) microprocessor (1217) processes the first datagram and determines, as described elsewhere herein, whether to issue a notification. If a notification is to be issued, the vehicle telematics system (1209) microprocessor (1217) creates the second datagram and transmits (1211) it to the mobile device (12132), which serves as the notification system (1213) in the depicted embodiment of FIG. 12C. In this embodiment, the second transmission (1211) will primarily be a wireless transmission from the vehicle telematics system (1209) wireless transmitter (1221) to the mobile device (1213).

In an alternative embodiment, the mobile device serves as the hub and the vehicle telematics system serves as the notification system. In a still further embodiment, both the telematics system and mobile device serve as both the hub and notification system. All combinations of these and other exemplary implementations are contemplated. The single-device systems of FIGS. 12A and 12B have the advantage of simplicity and fewer points of failure, but the versatility of FIG. 12C may make it desirable in certain circumstances.

For example, for families with multiple vehicles and mobile devices, but only one child seat (103), it may not be desirable to pair sensors (1205) with either vehicle, but rather to pair directly with each family member's mobile device. Alternatively, some vehicular telematics systems may lack the breadth of communications features available in a mobile device, and a family may elect to use the mobile device as the hub (1209) but display notifications on the vehicle telematics system display. Similarly, the cost of redundant long-range wireless communications services for both the mobile device and telematics system may motivate a family to select either a mobile device or telematics system for such services, but not both, and use the display feature of the mobile device and/or vehicle telematics system as the notification system (1213).

An advantage of the central hub (1209) is that the hub may pair with a plurality of sensors (1205), and sensors (1205) may be added or removed without the notification systems (1213) having to change or update configurations. This simplifies setup, installation, and configuration of the system significantly. Further, using multiple notification systems (1213) with the system is simpler because, when a new sensor (1205) is paired with the hub (1209), all notification systems (1213) receiving notifications from that hub (1209) may receive notifications of conditions (1201) detected by the new sensor (1205), and none of the notification systems (1213) need to pair or synchronize with the sensor (1205). This also makes it simpler to swap notification systems (1213) and simplifies the development of software for use with the systems and methods. Particularly in an emergency, it is desirable that the systems and methods be simple and intuitive so that a user, who may be flustered or panicked, can effectively use the systems and methods.

By way of example and not limitation, where a child is being babysat, the babysitter need only pair her own notification system (1213) (e.g., a mobile phone) with the hub (1209) to receive notifications of conditions detected by sensors paired with the central hub (1209), and need not pair with each sensor (1205).

Notification Systems

The notification system (1213) generally comprises a display. The display may be integrated into a device serving as a hub (1209), such as a vehicular telematics system or mobile device. In an alternative embodiment, the notification system (1213) may be or be part of a mobile device or vehicular telematics system separate and apart from the hub (1209), such as in the embodiment depicted in FIG. 12C. Where the notification system (1213) is integrated into the hub (1209), little or no configuration of the notification system is generally necessary. However, where the notification system (1213) is a separate device, one or more notification systems (1213) may be paired or synchronized with a central hub (1209) before receiving notifications from the hub (1209).

Generally, the notification system (1213) receives the second datagram, either via wireless transmission (1211) or over a wired connection (1211). The second datagram generally includes, or is based upon, at least some information about a condition (1201) detected by a sensor (1205) and included in the first datagram, and may optionally include other data as described elsewhere herein. The notification system (1213) analyzes the second datagram and conveys, or causes to be conveyed, some or all of the information contained in the second datagram to the user. It is generally contemplated that the information is conveyed by causing some or all of the information contained in the second datagram to be displayed on a visual output device, such as an LCD monitor or other display, such as a mobile device screen or vehicle telematics display.

The particular information displayed, including format and appearance, is generally based at least in part upon configuration options, which may be factory default settings and/or user-configured options. When a notification is displayed, the user may be asked to acknowledge the notification, such as by interacting with a graphical user interface on the display or pushing a button. The notification system (1213) may also have, or use, a user-configurable notification hierarchy (1041) wherein urgent notifications that are not timely acknowledged are repeated or result in alternative forms of notification, as defined by the notification hierarchy (1041).

In an embodiment, the notifications are displayed or caused to be displayed by application software. In an embodiment where the notification system (1213) is, or is part of, a mobile device, the application software may be a mobile device application installed on the mobile device. In an alternative embodiment where the notification system (1213) is, or is part of, a vehicle telematics system, the application software may be an application installed on the vehicle telematics system.

Notifications will generally be or include graphical elements displayed on a display. Graphical elements are sometimes also known in the art as GUI widgets, and may include, without limitation: buttons, alerts, check boxes, radio buttons, split buttons, sliders, drop-down lists, menus, ribbons, multi-select boxes, text areas, text forms, menus, pie menus, toolbars, combo boxes, tree and grid data viewers, panes and panel splits, links, tabs, scrollbars, labels, tooltips, modal windows and pop-ups, balloon help, progress bars, color wheels, collapsible frames and panels, dialog boxes, frames, status bars, information bars, images, text, animations, video, and any other graphical elements known or used in the art as part of a graphical user interface.

Application Software

In an embodiment, the notification system (1213) is, includes, or is part of application software, which conveys, or causes to be conveyed, notifications to a user. For example, in an embodiment where a vehicular telematics system (1209) display (1213) is the notification system (1213), such as the depicted embodiment of FIG. 12A, application software running on the vehicle telematics system (1209) logic unit (1217) generally causes notifications to be displayed on the display (1213) by transmitting (1211) notifications to the display (1213). In an alternative embodiment, where a mobile device display (1213) is the notification system (1213) such as the depicted embodiment of FIG. 12B, application software running on a mobile device (1209) logic unit (1217) generally causes notifications to be displayed on the mobile device display (1213) by transmitting (1211) notifications to the display (1213). In both of these embodiments, the hub (1209) device pairs with the sensors (1205) and no further configuration is generally required to display notifications on the notification system (1213). In alternative embodiments, such as that depicted in FIG. 12C, the user may pair a notification system (1213) with the hub (1209).

In an embodiment, the notification system (1213) is, includes, or is part of, mobile device application software which implements, in whole or in part, features and functionality similar to the embodiments of the mobile device application software contemplated by U.S. Utility patent application Ser. No. 13/835,498 filed Mar. 15, 2013, the entirety of which is elsewhere herein incorporated by reference. In another embodiment, the notification system (1213) is, includes, or is part of, vehicular telematics system software which implements, in whole or in part, features and functionality similar to the embodiments of the mobile device application software contemplated by U.S. Utility patent application Ser. No. 13/835,498 filed Mar. 15, 2013. This disclosure describes some, but not necessarily all, of those features and functions implemented in the present systems and methods. This description should be understood as exemplary, not limiting, and it is specifically contemplated that all features and functions of the embodiments of the mobile device application software contemplated by U.S. Utility patent application Ser. No. 13/835,498 filed Mar. 15, 2013, may also be implemented for use in the present system and methods, in any application software regardless of platform, in similar fashion to the exemplary embodiments described herein, wherein the notification system (1213) of the present systems and methods generally implements the application software described in the above-referenced application for indirect monitoring of sensors (1205) through a hub (1209) with which the notification system (1213) is paired, or into which the notification is integrated, instead of direct pairing with a monitor as described in the above-referenced application.

Where a notification system (1213) is not part of the hub (1209), such as the depicted embodiment of FIG. 12C, the notification system (1213) is generally wirelessly paired or bonded with the hub (1209) as described herein, or using any other technique now know or in the future developed in the art. Pairing establishes a communications channel between the hub (1209) and notification system (1213) through which a second datagram can be transmitted (1211). In an alternative embodiment, pairing uses a wired connection, such as a data communications and/or power/charging cable, as elsewhere described herein. By way of example and not limitation, a user pairing a mobile phone with a hub (1209) in a vehicle telematics system may communicate with the hub (1209) by plugging the phone into a USB cable and plugging the USB cable into the vehicle telematics system. In a still further embodiment, a mobile device may communicate with a vehicle telematics system through both wireless and wired communication.

In an embodiment, the application software may scan for hubs (1209) with which it may pair, such as by using self-discovering protocols and devices. In the preferred embodiment, the application software communicates with the hub (1209) using the Bluetooth® protocol, but other protocols may be used, including but not limited to IEEE 802.11, 3G, 4G, LTE, and other wireless communication protocols now known in the art or in the future developed.

In an embodiment where a notification system (1213) pairs with a hub (1209), the notification system (1213) generally displays an identifier uniquely identifying each detected hub (1209). This identifier assists the user in determining which hub(s) (1209) the user wishes to pair with the notification system (1213). In an embodiment, the user may change the unique identifier displayed for a hub (1209), such as to provide a user-friendly manner for identifying a particular hub (1209). For example, the default identifier may be a serial number or hardware address which is meaningless to the user and difficult to remember. However, the user may assign a user-defined custom identifier to a hub (1209) via the application software on the notification system (1213), such as a plain language identifier which identifies the vehicle and/or the child seat (103) installed in the vehicle (e.g., "Honda Odyssey, Charlie's infant seat"). This is particularly helpful for families with multiple children who use child seats (103), such as families with twins or multiple children, and families with multiple vehicles having child seats (103). It should be noted that this identifier does not necessarily alter unique identifiers assigned to a hub (1209), such as the serial number or hardware address. This allows a user-defined identifier for a hub (1209) to change the identification of that hub (1209) as displayed by the user's particular notification system (1213), but allows different users of different notification systems (1213) to have a different custom identifier for the same hub (1209).

In an embodiment where a notification system (1213) is paired with a hub (1209), application software may provide an interface indicating the child seat(s) (103) and/or sensors (1205) monitored by the hub (1209). The application software may also indicate child seats (103) that have been detected or paired with the hub (1209) but are not being monitored by the hub (1209). The application also may allow the user to select the child seat or seats (103) monitored by the hub (1209) for which the user wishes to receive notifications (1213). By way of example and not limitation, where the user has multiple child seats (103) in a vehicle but is traveling with only one child occupying one child seat (103), the user may temporarily disable alerts for the unoccupied seats to avoid receiving superfluous notifications related to those seats.

This technology may be implemented in several operational modes. For example, in an embodiment, the user-defined configuration settings cause the hub (1209) not to transmit certain notifications to the particular notification system (1213). In an alternative embodiment, the hub (1209) transmits notifications regardless of the user-defined configuration settings, but the notification system (1213) determines which notifications to convey based on the user-defined configuration settings.

Although visual output systems, such as displays, are generally contemplated, in an embodiment, notifications are also, or alternatively, conveyed using a different visual output system, or a non-visual output system. By way of example and not limitation, a notification may be conveyed by playing sound through a device's audio system or activating lights. For example, where the notification system (1213) is a mobile device, an LED camera flash or a vibrating motor may alert the user to a notification. Also by way of example and not limitation, where the notification system (1213) is a vehicular telematics system, the vehicle's audio systems may be used to convey notifications, such as by playing a chime or other alert sound, or using text-to-speech to convey verbal notifications, and the vehicle's horn may be sounded. Alternatively, various vehicular lightning systems may be activated, including headlights, running lights, high beams, fog lamps, hazard lights, or internal lights. Other vehicular systems can also provide visual notification, such as activating windshield wipers.

The notification system (1213) may convey other information in addition to notifications, including but not limited to status information. As with notifications, this information will generally be displayed through a graphical user interface. Status information may include, among other things, that notification application software is running, that the application is paired with a hub (1209), the identity of a paired hub (1209), the identity of a child seat (103) monitored by the hub (1209), the identity of a child seat (103) for which the application and/or notification system (1213) is receiving notifications, and/or the current detected status of a condition (1201) detected by a sensor (1205), including but not limited to orientation of a child seat (1213), the belt tension of belts attaching a child seat (103) to a vehicle, belt tension of belts holding a child to the child seat (103), whether a child is in a child seat (103), whether safety restraints are engaged, whether the vehicle is moving, the amount of time elapsed since a previous condition or alert of a condition was conveyed, the amount of time remaining until a condition left unaddressed produces an alert or notification, the temperature of the vehicle interior near a child seat (103), or any other condition contemplated herein or otherwise known in the art.

In an embodiment, the user interface includes graphical or audible cues to quickly convey information to the user without the user having to study or examine the interface for a significant amount of time. This is particularly important where the user is operating the vehicle and it is preferable that the user does not divert attention from safe vehicle operation. For example, the application may include a color-coded indicator, such as a border around a status indicator, which indicates whether the condition is acceptable (e.g., green) or requires attention (e.g., red). Where all reported conditions are acceptable—for example, temperature near the child is within tolerances, the child seat is installed at proper orientation and with acceptable belt tension; the child is in the seat with safety restraints engaged—the color indicator is green. If any condition is not acceptable, the color indicator is red.

In an embodiment, a status color may be selected for a given condition (1201) based in part upon whether a second condition (1201) is detected to exist. By way of example and not limitation, the status border may be yellow where a child is in the child seat and the safety restraint belts are not clasped, but the vehicle is not in motion. However, the status border may change to orange if the same condition (1201) persists while the vehicle is in motion. Similarly, the status may be orange or red if the child vacates the child seat with the vehicle in motion. Where the application has lost its connection to the child seat monitoring system, the border may change to red or another distinctive color to alert the user that the connection has been lost and the information displayed may not be current. The user may thus glance only momentarily at the application and quickly assess whether any condition (1201) exists which the user should address.

The particular color scheme used generally depends on the severity of a condition (1201). A more severe condition (1201) is assigned alarming colors that generally psychologically associated by most users with increasing levels of risk or danger, with cool tones such as green and blue indicating safe conditions (1201), and warm tones such as red and orange indicating dangerous or risky conditions (1201). The color coding may also vary within a given condition (1201) depending on the severity of the condition detected (1201). For example, where the condition is internal cabin temperature near the child seat (103), the color indicator may be orange if the temperature drops below 60 degrees, and may turn red if it drops below 40 degrees, quickly conveying to the user not only that a temperature condition (1201) exists which requires addressing, but the approximate severity of the condition (1201). In an embodiment, the thresholds for these color indicators may be set by the user, or may be automatically adjusted depending on other conditions. By way of example and not limitation, the user may provide configuration data which causes a notification system (1213) to convey a basic alert (e.g., orange) if temperature is below 65 degrees or above 80 degrees, and to convey an urgent alert (e.g., red) if the temperature is below 50 degrees or above 90 degrees. In an embodiment, the user may define one or more such alert levels.

As described elsewhere herein, in an embodiment, audible notifications may be provided. By way of example and not limitation, such notifications may use a mobile device's speaker or vehicular sound system. Auditory notifications have the advantage that the user need not consult the device screen at all to be alerted to a condition (1201), which is particularly important while operating a vehicle. In such an embodiment, the user may assume all monitored conditions (1201) are acceptable unless the notification system (1213) provides a contrary auditory notification. In a still further embodiment, the device's vibrate feature is activated to indicate a condition (1201).

In an embodiment, notification system (1213) application software may include, in addition to a notification, user interface elements which allow the user to address or acknowledge the notification. By way of example and not limitation, the graphical user interface may include a button element which, if touched, indicates that the user wishes to disregard, cancel, or "snooze" the notification. The user may ignore the alert if the user is aware of the condition (1201) and the condition (1201) is not a concern (such an empty child seat when child is at home and not in the vehicle at all). In an embodiment, the button element in the user interface indicates the reason the alert was triggered. Although a touch-screen button element is described, any system or method known in the art, or in the future developed, for a user to provide an acknowledgement or instruction to computer software is contemplated, including but not limited to touchscreen GUI elements, gestures, verbal responses, and hardware input devices such as a mouse, keyboard, or buttons.

In an embodiment, the notification system (1213) displays the elapsed time, or duration, of a detected condition (1201). By way of example and not limitation, where the child vacates the child seat (103) while the vehicle is in motion, the notification system (1213) may display a timer or other status indicator showing when the condition (1201) was first detected, and/or the duration for which the condition (1201) has been detected.

In an embodiment, a user may configure the systems and methods to use a notification or alert hierarchy, or escalation hierarchy, through which the user provides configuration data indicating notification channels, addresses, and associated priority information. The systems and methods may use this information to determine (1217) whether notification of a given condition (1201) should be provided and, if so, to whom and through what communications channels and/or notification systems (1213). An example of such a notification hierarchy, also sometimes described as an escalation hierarchy or alert hierarchy, is described in U.S. Utility patent application Ser. No. 13/835,498 filed Mar. 15, 2013, the entirety of which is elsewhere herein incorporated by reference.

While this disclosure generally contemplates that the notification system (1213) is implemented via a vehicular telematics system or mobile device, in an embodiment a notification system (1213) is implemented via a different technology, device, or communication channel. By way of example and not limitation, such technologies, devices, and/or communications channels include: landline telephone services, desktop PCs, gaming consoles, and pagers. For example, where an embodiment uses e-mail messages as a notification, a user may receive such messages on a desktop PC. In such an embodiment, the e-mail system, e-mail client software, and desktop PC may be part of the notification system (1213).

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

The invention claimed is:

1. A system for providing notifications of a condition relating to a child in vehicular child seat, the system comprising:
   a sensor detecting a condition relating to a vehicular child seat or a child in said vehicular child seat when said vehicular child seat is installed in a vehicle;
   a central hub comprising:
   a transmitter/receiver receiving from said sensor a first datagram containing information related to said detected condition;
   a microprocessor;

a non-transitory computer-readable medium having programming instructions which, when executed by said microprocessor, cause a second datagram to be formed containing notification information, said notification information based at least in part upon at least some of said information related to said detected condition contained in said first datagram;

a notification system receiving from said central hub said second datagram and conveying a notification to a user, said notification based at least in part upon at least some of said notification information in said second datagram.

2. The system of claim 1, wherein said sensor is selected from the group consisting of: a three-axis accelerometer; a force transducer; and a temperature sensor.

3. The system of claim 1, wherein said condition is selected from the group consisting of: the orientation of said vehicular child seat in said vehicle; the tension on a safety restraint belt; and, the air temperature near a child in said vehicular child seat.

4. The system of claim 1, wherein said central hub is a vehicular telematics system.

5. The system of claim 4, wherein said vehicular telematics system comprises a display and said notification system comprises said vehicular telematics system display.

6. The system of claim 5, wherein said notification is a graphical element displayed on said display.

7. The system of claim 1, wherein said notification system comprises a speaker and said notification comprises is a sound emitted by said speaker.

8. The system of claim 1, wherein said notification is a user-defined text message sent to a user-defined mobile telephone number.

9. The system of claim 1, wherein said notification is a user-defined e-mail message sent to a user-defined e-mail address.

10. The system of claim 1, wherein said non-transitory computer-readable medium further comprises notification hierarchy data comprising a plurality of notification addresses having associated notification priority data.

11. The system of claim 10, wherein said non-transitory computer-readable medium further comprises programming instructions which, when executed by said microprocessor, select from said notification hierarchy one or more addresses, said selection based at least in part on said associated notification priority data for said selected one or more addresses.

12. The system of claim 11, wherein each of said selected one or more addresses is a notification system receiving said second datagram and conveying a notification to a user, said notification based at least in part upon at least some of said notification information in said second datagram.

13. A method for notifying a user of a condition related to a child in a child seat comprising the steps of:

providing a child seat installable in a vehicle and comprising one or more sensors capable of detecting a condition related to a child when said child is in said child seat and said child seat is installed in said vehicle;

providing a central hub;

providing a notification system;

one or more of said one or more sensors detecting a condition related to a child in said child seat when said child seat is installed in a vehicle;

forming a first datagram comprising information related to said detected condition;

transmitting said first datagram to said central hub in a first transmission;

said central hub forming a second datagram comprising notification information, said notification information based at least in part upon at least some of said information related to said detected condition in said first datagram received by said central hub;

transmitting said second datagram to said notification system in a second transmission;

said notification system conveying a notification about said detected condition to a user, said notification based at least in part on at least some of said notification information in said second datagram received by said notification system.

14. The method of claim 13, wherein said sensor is selected from the group consisting of: a three-axis accelerometer; a force transducer; and a temperature sensor.

15. The method of claim 13, wherein said condition is selected from the group consisting of: the orientation of said vehicular child seat in said vehicle; the tension on a safety restraint belt; and, the air temperature near a child in said vehicular child seat.

16. The method of claim 13, wherein said central hub is a vehicular telematics system comprising a display and said notification system is said vehicular telematics system display.

17. The method of claim 13, said method further comprising the steps of:

providing a plurality of notification systems comprising said notification system;

providing a notification hierarchy comprising notification addresses and notification priority data for each notification system in said plurality of notification systems;

before transmitting said second datagram to said notification system in said second transmission, selecting said notification system from said plurality of notification systems, said selection based at least in part on said notification priority data associated with said notification system.

18. The method of claim 13, wherein said notification hierarchy comprises notification addresses and notification priority data supplied by a user.

* * * * *